US012650166B2

(12) United States Patent
    Suzuki et al.

(10) Patent No.: US 12,650,166 B2
(45) Date of Patent: Jun. 9, 2026

(54) VEHICLE DRIVE DEVICE

(71) Applicants: AISIN CORPORATION, Kariya (JP); DENSO CORPORATION, Kariya (JP); BLUE NEXUS CORPORATION, Anjo (JP)

(72) Inventors: Tomoyuki Suzuki, Kariya (JP); Shoichi Yamasaki, Kariya (JP); Takeshi Torii, Anjo (JP); Seiichiro Nishimachi, Kariya (JP)

(73) Assignees: AISIN CORPORATION, Kariya (JP); DENSO CORPORATION, Kariya (JP); BLUE NEXUS CORPORATION, Anjo (JP)

( * ) Notice: Subject to any disclaimer, the term of this patent is extended or adjusted under 35 U.S.C. 154(b) by 0 days.

(21) Appl. No.: 19/104,579

(22) PCT Filed: Sep. 7, 2023

(86) PCT No.: PCT/JP2023/032740
    § 371 (c)(1),
    (2) Date: Feb. 18, 2025

(87) PCT Pub. No.: WO2024/053716
    PCT Pub. Date: Mar. 14, 2024

(65)          Prior Publication Data
    US 2026/0055807 A1      Feb. 26, 2026

(30)      Foreign Application Priority Data

Sep. 9, 2022    (JP) ................................. 2022-143733
    Mar. 30, 2023   (JP) ................................. 2023-055486

(51) Int. Cl.
    B60K 1/00          (2006.01)
    B60L 15/00         (2006.01)
         (Continued)

(52) U.S. Cl.
    CPC ............. F16H 57/037 (2013.01); B60K 1/00 (2013.01); B60L 15/007 (2013.01);
         (Continued)

(58) Field of Classification Search
    CPC ......... F16H 57/037; F16H 2057/02034; F16H 2057/02052; B60K 1/00; B60K 2001/001; B60L 15/007; H02K 5/04
         (Continued)

(56)          References Cited

U.S. PATENT DOCUMENTS

2008/0049476 A1*  2/2008  Azuma .................. H02M 7/003
                                                    361/699
2017/0158042 A1*  6/2017  Miyazawa ................ B60L 1/02
         (Continued)

FOREIGN PATENT DOCUMENTS

EP          4506196 A1 *  2/2025  ............. B60L 58/26
JP       2017-229174 A   12/2017
         (Continued)

OTHER PUBLICATIONS

Sep. 23, 2025 Search Report issued in European Patent Application No. 23 863 254.1.

*Primary Examiner* — Toan C To
(74) *Attorney, Agent, or Firm* — Oliff PLC

(57)          ABSTRACT

A vehicle drive device includes: a rotating electrical machine; a differential transmission device; a power transmission device; a power module; a wiring portion; and a case. The case forms, above a plane including the axis of a rotation shaft of the rotating electrical machine and the axis of an output shaft, a first, second, and third housing portion. The first portion overlaps the rotating electrical machine as viewed in an axial direction of the rotating electrical machine, and overlaps the power transmission device as viewed in an up-down direction. The second portion over- (Continued)

laps the rotating electrical machine as viewed in a direction perpendicular to both the axial direction of the rotating electrical machine and the up-down direction, and overlaps the output shaft as viewed in the up-down direction. The third portion is adjacent to the first and second portions, and overlaps the output shaft as viewed in the up-down direction.

12 Claims, 21 Drawing Sheets

(51) Int. Cl.
*F16H 57/037* (2012.01)
*F16H 57/02* (2012.01)
*H02K 5/04* (2006.01)

(52) U.S. Cl.
CPC .................. *B60K 2001/001* (2013.01); *F16H 2057/02034* (2013.01); *F16H 2057/02052* (2013.01); *H02K 5/04* (2013.01)

(58) Field of Classification Search
USPC ......................................................... 180/378
See application file for complete search history.

(56) References Cited

U.S. PATENT DOCUMENTS

| | | | | |
|---|---|---|---|---|
| 2021/0086635 | A1* | 3/2021 | Ueda .................. | H05K 7/20927 |
| 2022/0274476 | A1* | 9/2022 | Yamashita ............. | B60K 17/16 |
| 2022/0281301 | A1* | 9/2022 | Nagaya .................. | H02K 7/116 |
| 2024/0088743 | A1* | 3/2024 | Ito .......................... | H02K 11/33 |
| 2025/0050722 | A1* | 2/2025 | Katsuda .................. | B60K 1/00 |
| 2025/0070621 | A1* | 2/2025 | Hattori .................. | H02K 5/225 |
| 2025/0303847 | A1* | 10/2025 | Sugimoto ............. | B60K 6/405 |

FOREIGN PATENT DOCUMENTS

| | | |
|---|---|---|
| JP | 2021-151111 A | 9/2021 |
| WO | 2021/172328 A1 | 9/2021 |

* cited by examiner

2(100)

BT40     BT40

203

BT40

X1

X

X2

BT40     BT40     BT40

A2 ←     → A1

A

VEHICLE DRIVE DEVICE

TECHNICAL FIELD

The present disclosure relates to vehicle drive devices.

BACKGROUND ART

A technique is known in which, in a vehicle drive device that includes a power module and a rotating electrical machine in a case, a three-phase wiring portion from the rotating electrical machine is provided using only the space above an output member.

RELATED ART DOCUMENTS

Patent Documents

Patent Document 1: WO 2021/172328

SUMMARY OF THE DISCLOSURE

Problem to be Solved by the Disclosure

In the above related art, however, the three-phase wiring portion and the power module are arranged so as to overlap each other in an up-down direction. This tends to increase the size in the up-down direction. As described above, in a vehicle drive device that includes a power module and a rotating electrical machine in a case, it is difficult to reduce the sizes in the up-down direction and a horizontal direction while securing a mounting space for the power module, a wiring portion, etc.

Therefore, in one aspect, an object of the present disclosure is to reduce the sizes in the up-down direction and the horizontal direction of a vehicle drive device that includes a power module and a rotating electrical machine in a case.

Means for Solving the Problem

One aspect provides a vehicle drive device including: a rotating electrical machine disposed on a first axis;
  a differential transmission device disposed on a second axis parallel to the first axis and drivingly connected to a wheel;
  a power transmission device disposed on the first axis and drivingly connected between the differential transmission device and the rotating electrical machine;
  a power module including a power semiconductor element and configured to convert electric power to be supplied to the rotating electrical machine;
  a smoothing capacitor electrically connected between the power module and a power supply;
  a wiring portion that electrically connects the rotating electrical machine and the power module; and
  a case that houses the rotating electrical machine, the differential transmission device, the power transmission device, the power module, the smoothing capacitor, and the wiring portion.
The case forms a housing portion above a plane including the first axis and the second axis.
The housing portion includes a first housing portion that houses the wiring portion, a second housing portion that houses the smoothing capacitor, and a third housing portion that houses the power module.

The first housing portion, the second housing portion, and the third housing portion are in an L-shape as a whole and overlap the first axis and the second axis, as viewed in an up-down direction.

Effects of the Disclosure

In one aspect, the present disclosure can reduce the sizes in the up-down direction and the horizontal direction of a vehicle drive device that includes a power module and a rotating electrical machine in a case.

MODES FOR CARRYING OUT THE DISCLOSURE

Figure 1:
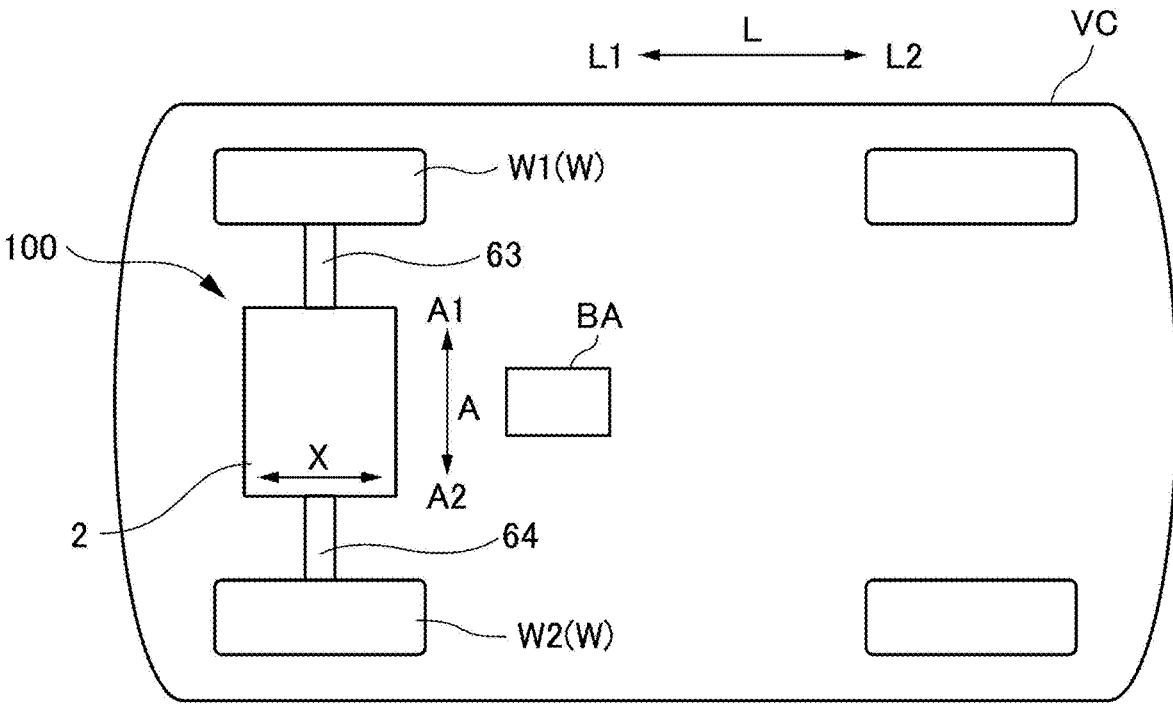
FIG. 1 is a schematic view of a vehicle drive device mounted on a vehicle, as viewed from above.

Embodiments will be described in detail below with reference to the accompanying drawings. The dimensional ratios in the drawings are merely illustrative, and are not limited to these. The shapes etc. in the drawings may be partially exaggerated for convenience of description.

In the following description, the vertical direction V (see FIG. 4 etc.) means the vertical direction when a vehicle drive device 100 is in use, that is, the vertical direction when the vehicle drive device 100 is disposed in an orientation in which it is supposed to be used. Since the vehicle drive device 100 is mounted on a vehicle VC (see FIG. 1) and used, the vertical direction V coincides with the vertical direction when the vehicle drive device 100 is mounted on the vehicle VC (hereinafter referred to as "vehicle-mounted state"), more specifically, the vertical direction when the vehicle drive device 100 is in the vehicle-mounted state and the vehicle VC is stopped on a flat road (road along a horizontal plane). An upper side V1 and a lower side V2 mean the upper side and the lower side in the vertical direction V. The direction of each member in the following description represents the direction of the member mounted on the vehicle drive device 100. Terms related to the dimension of each member, the direction in which each member is disposed, and the position where each member is disposed, etc. represent concepts including a state in which there is a deviation due to a variation (variation to an extent that is allowable in manufacturing).

In the present application, "drivingly connected" refers to a state in which two rotating elements are connected such that a driving force (synonymous with torque) can be transmitted therebetween, and includes a state in which the two rotating elements are connected so as to rotate together or a state in which the two rotating elements are connected such that a driving force can be transmitted therebetween via one or more transmission members. Such transmission members include various members that transmit rotation at the same speed or at a shifted speed (e.g., a shaft, a gear mechanism, a belt, and a chain). The transmission members may include engagement devices that selectively transmit rotation and a driving force (e.g., a friction engagement device and an intermesh engagement device).

In the present specification, the "rotating electrical machine" is used as a concept including a motor (electric motor), a generator (power generator), and a motor generator that functions as both a motor and a generator as necessary. In the present specification, regarding arrangement of two members, the "two members overlap each other as viewed in a specific direction" means that, when an imaginary straight line parallel to the direction of the line of sight is moved in all directions perpendicular to the imaginary straight line, an area where the imaginary straight line intersects both of the two members is preset at least in part. In the present specification, regarding arrangement of two members, the "regions in a specific direction where the two members are disposed overlap each other" means that the region in the specific direction where one member is disposed includes at least part of the region in the specific direction where the other member is disposed.

Figure 2:
FIG. 2 is a sectional view of a main part of the vehicle drive device.
Figure 2A:
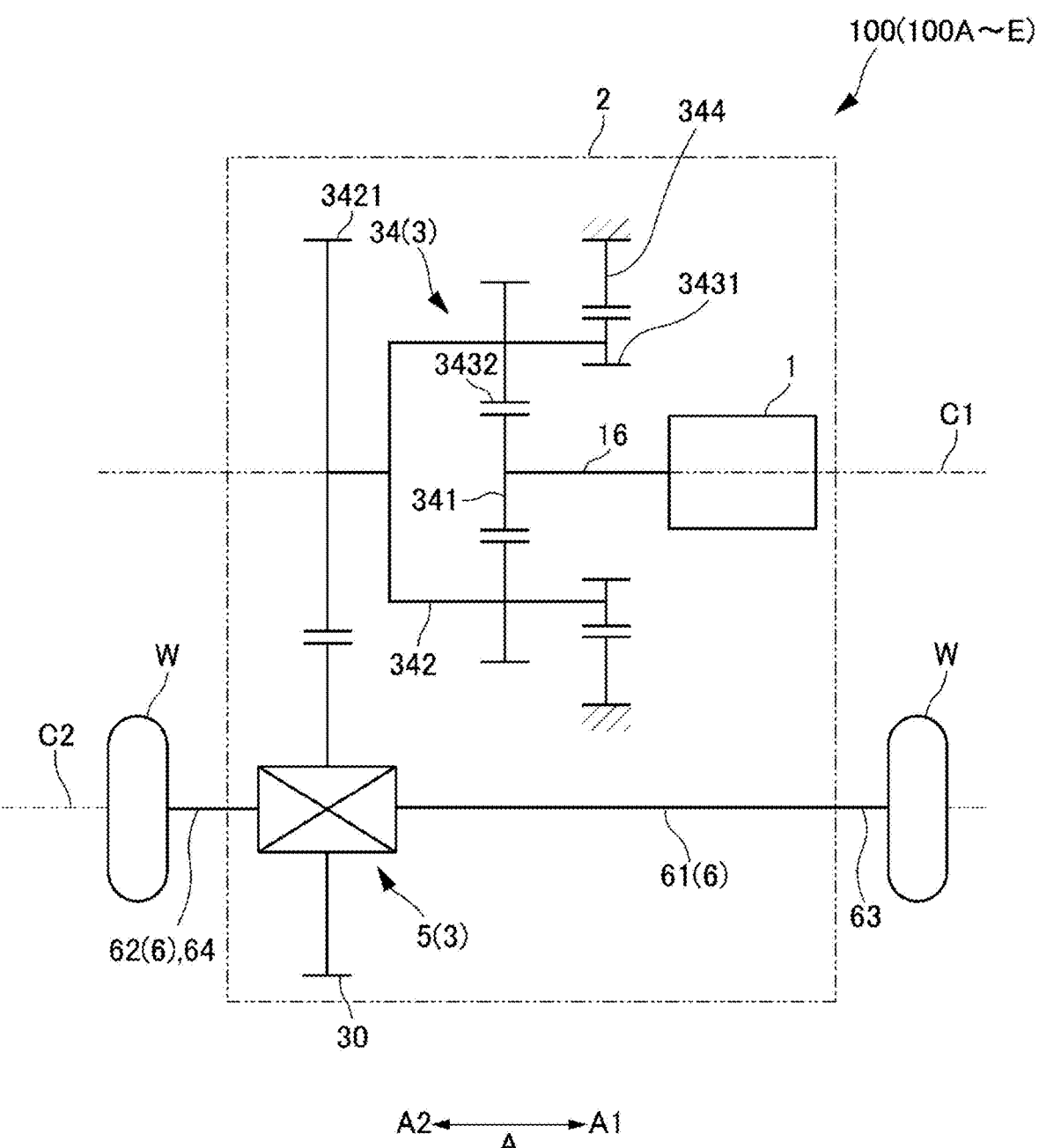
FIG. 2A is a skeleton diagram showing the vehicle drive device.
Figure 3:
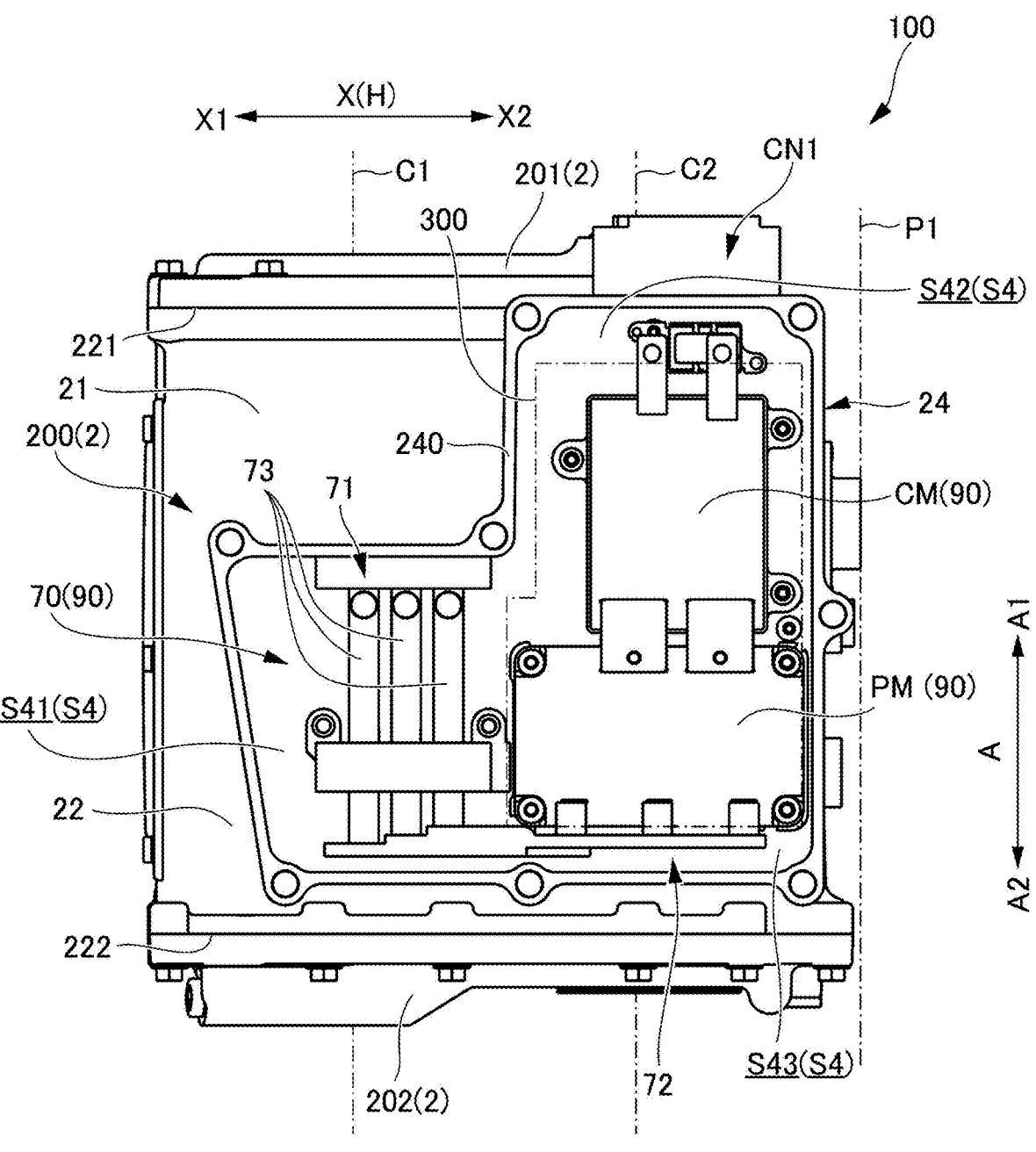
FIG. 3 is a top view schematically showing a vehicle drive device according to an embodiment.
Figure 4:
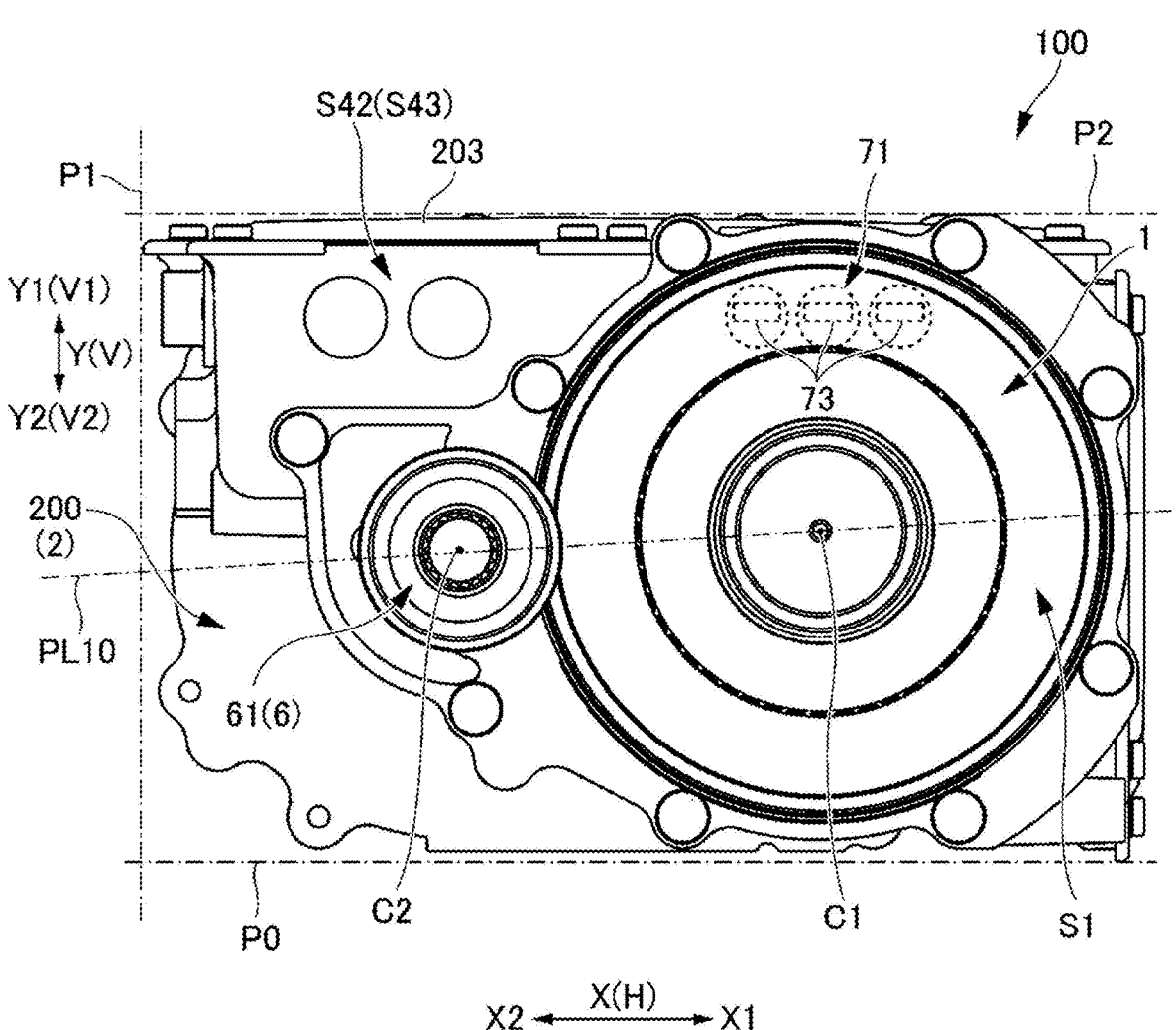
FIG. 4 is a side view schematically showing the vehicle drive device according to the embodiment.

FIG. 1 is a schematic view of the vehicle drive device 100 mounted on the vehicle VC, as viewed from above. FIG. 2 is a sectional view of a main part of the vehicle drive device 100. FIG. 2A is a skeleton diagram showing the vehicle drive device 100. FIG. 3 is a top view schematically showing the vehicle drive device 100 according to the present embodiment, and FIG. 4 is a side view schematically showing the vehicle drive device 100 according to the present embodiment. In FIG. 3, an inverter cover member 203 at the top of an inverter case portion 24 is not shown in order to show elements disposed inside the inverter case portion 24.

As schematically shown in FIG. 1, the vehicle drive device 100 includes a rotating electrical machine 1, a pair of output members 6 each drivingly connected to a corresponding one of a pair of wheels W (see FIG. 1), a transmission mechanism 3 that transmits a driving force between the rotating electrical machine 1 and the pair of output members 6, and an inverter device 90 that controls driving of the rotating electrical machine 1. The vehicle drive device 100 further includes a case 2 that houses the rotating electrical machine 1 and the inverter device 90. The case 2 also houses the pair of output members 6 and the transmission mechanism 3.

A first output member 61 that is one of the pair of output members 6 is drivingly connected to a first wheel W1 that is one of the pair of wheels W, and a second output member 62 that is the other of the pair of output members 6 is drivingly connected to a second wheel W2 that is the other of the pair of wheels W. As shown in FIG. 1, the vehicle VC on which the vehicle drive device 100 is mounted includes a first drive shaft 63 that rotates with the first wheel W1, and a second drive shaft 64 that rotates with the second wheel W2. The first drive shaft 63 is connected to the first wheel W1 via, for example, a constant velocity joint, and the second drive shaft 64 is connected to the second wheel W2 via, for example, a constant velocity joint. The first output member 61 is connected to the first drive shaft 63 so as to rotate with the first drive shaft 63, and the second output member 62 is connected to the second drive shaft 64 so as to rotate with the second drive shaft 64.

The vehicle drive device 100 transmits output torque of the rotating electrical machine 1 to the pair of wheels W via the pair of output members 6 to cause the vehicle VC on which the vehicle drive device 100 is mounted to travel. That is, the rotating electrical machine 1 is a driving force source for the pair of wheels W. The pair of wheels W is a pair of right and left wheels (e.g., a pair of right and left front wheels or a pair of right and left rear wheels) of the vehicle VC. The rotating electrical machine 1 may be, for example, an alternating-current rotating electrical machine that is driven by a three-phase alternating current (example of a multiphase alternating current). The rotating electrical machine 1 is electrically connected to a battery BA (including an energy storage device such as a capacitor) via the inverter device 90 that performs power conversion between direct current power and alternating current power. The rotating electrical machine 1 is supplied with electric power from the battery BA to perform power running, or supplies electric power generated by the inertial force of the vehicle VC etc. to the energy storage device to store the electric power in the energy storage device.

As shown in FIG. 2, the rotating electrical machine 1 and the pair of output members 6 are disposed on two separate axes that are parallel to each other (specifically, a first axis C1 and a second axis C2). Specifically, the rotating electrical machine 1 is disposed on the first axis C1, and the pair of output members 6 is disposed on the second axis C2 different from the first axis C1. The first axis C1 and the second axis C2 are axes (imaginary axes) arranged parallel to each other. The transmission mechanism 3 includes, coaxially with the pair of output members 6 (i.e., on the second axis C2), an output gear (ring gear) 30 drivingly connected to at least one of the pair of output members 6.

As shown in FIG. 1, the vehicle drive device 100 is mounted on the vehicle VC in such an orientation that an axial direction A extends along the left-right direction of the vehicle. The axial direction A is a direction parallel to the first axis C1 and the second axis C2, in other words, a common axial direction of the first axis C1 and the second axis C2. That is, the axial direction A is a direction in which the rotation axis of the rotating electrical machine 1 extends, and is also a direction in which the rotation axis of the pair of output members 6 extends. One side in the axial direction A will be referred to as first side A1 in the axial direction, and the other side in the axial direction A (opposite side in the axial direction A from the first side A1 in the axial direction) will be referred to as second side A2 in the axial direction. The first side A1 in the axial direction is the side on which the rotating electrical machine 1 is disposed with respect to the transmission mechanism 3 in the axial direction A. As shown in FIG. 2, the first output member 61 is the output member 6 disposed on the first side A1 in the axial direction out of the pair of output members 6. The second output member 62 is the output member 6 disposed on the second side A2 in the axial direction out of the pair of output members 6.

As shown in FIG. 1, the vehicle drive device 100 may be mounted on the vehicle VC in such an orientation that the first side A1 in the axial direction is the right side of the vehicle and the second side A2 in the axial direction is the left side of the vehicle. In this case, the first wheel W1 to which the first output member 61 is drivingly connected is a right wheel, and the second wheel W2 to which the second output member 62 is drivingly connected is a left wheel. In FIG. 1, it is assumed that the vehicle drive device 100 is a front-wheel drive type drive device that drives a pair of right and left front wheels. Therefore, in the example shown in FIG. 1, the first wheel W1 is the right front wheel, and the second wheel W2 is the left front wheel.

As shown in FIG. 2, the rotating electrical machine 1 includes a rotor 10 and a stator 11. The stator 11 is fixed to the case 2, and the rotor 10 is supported by the case 2 so as to be rotatable relative to the stator 11. The rotating electrical machine 1 may be an inner rotor type rotating electrical machine. In this case, the rotor 10 may be disposed radially inward of the stator 11 so as to overlap the stator 11 as viewed in a radial direction along a radial direction. As used herein, the radial direction is a radial direction about the first axis C1, in other words, a radial direction about the rotation axis of the rotating electrical machine 1.

The stator 11 includes a stator core 12 and coil end portions 13 protruding in the axial direction A from the stator core 12. A coil is wound around the stator core 12, and portions of the coil that protrude in the axial direction A from the stator core 12 form the coil end portions 13. The coil end portions 13 are formed on both sides of the stator core 12 in the axial direction A.

Figure 20:
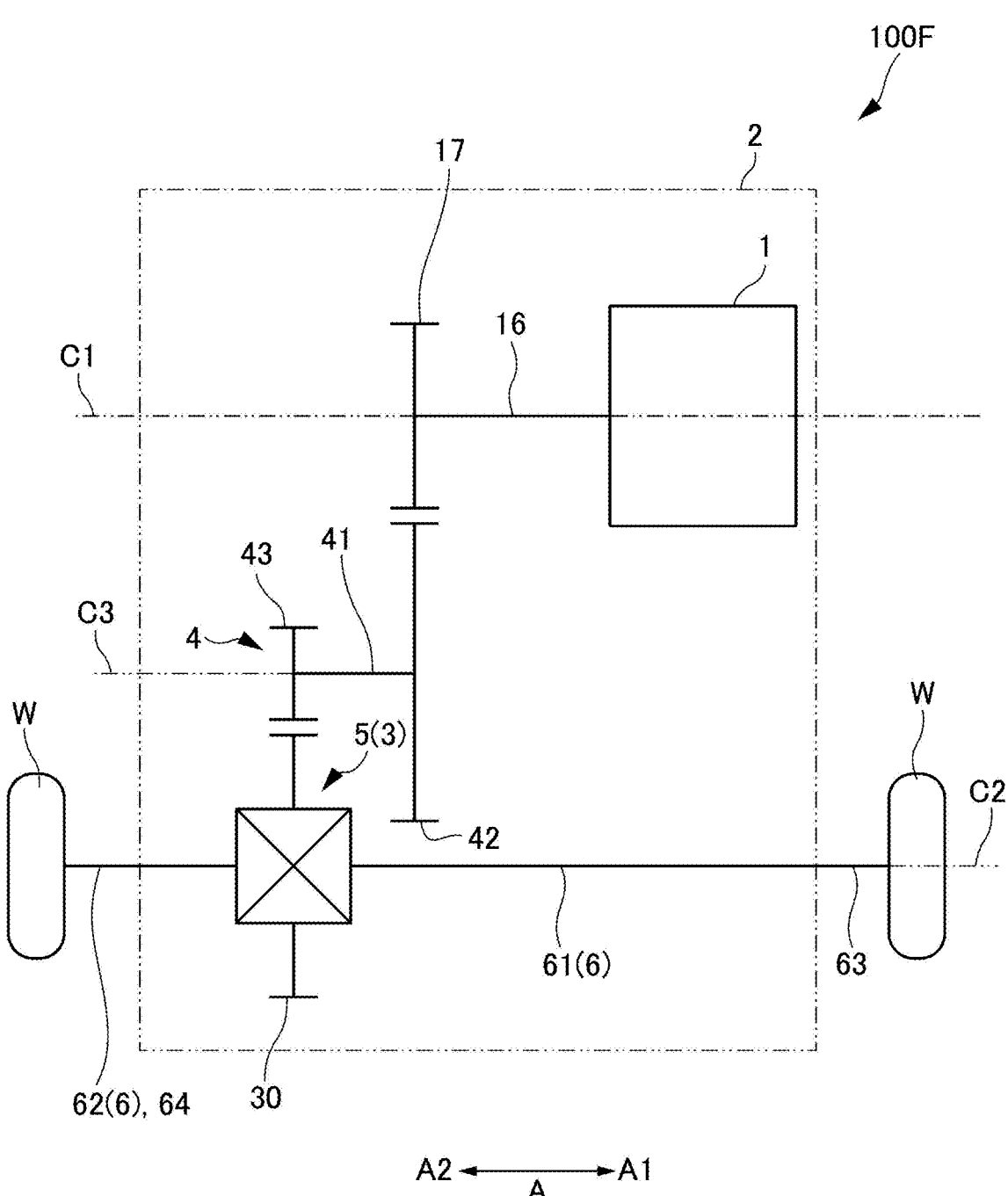
FIG. 20 is an illustration of a vehicle drive device with a three-axis configuration.

The transmission mechanism 3 includes a speed reduction mechanism 34 in a power transmission path between the rotating electrical machine 1 and the output gear 30. The speed reduction mechanism 34 may be any speed reduction mechanism, and may include a speed reduction mechanism using a counter gear, a speed reduction mechanism using a planetary gear, etc. In the present embodiment, as an example, the speed reduction mechanism 34 includes a planetary gear mechanism, and the speed reduction mechanism 34 is disposed coaxially with the rotating electrical machine 1. A transmission gear 3421 from the speed reduction mechanism 34 meshes with the output gear 30 of the differential gear mechanism 5 in the radial direction. Such a vehicle drive device 100 can have a compact configuration with two axes (first axis C1 and second axis C2). In a modification, the vehicle drive device 100 may have three or more axes (will be described later with reference to FIG. 20).

In the present embodiment, the speed reduction mechanism 34 is disposed coaxially with the rotating electrical machine 1 (that is, on the first axis C1) so as to be drivingly connected to the rotating electrical machine 1. An input member 16 that meshes with a sun gear 341 of the speed reduction mechanism 34 is connected to the rotor 10 so as to rotate with the rotor 10. In the example shown in FIG. 2, the vehicle drive device 100 includes a rotor shaft 15 to which the rotor 10 is fixed, and the input member 16 is connected to the rotor shaft 15 so as to rotate with the rotor shaft 15. Specifically, a part of the input member 16 on the first side A1 in the axial direction may be connected (in this example, connected by splines) to a part of the rotor shaft 15 on the second side A2 in the axial direction. Unlike such a configuration, the rotor shaft 15 and the input member 16 of the vehicle drive device 100 may be integrally formed as a single-piece member.

In the present embodiment, a carrier 342 may rotatably support a first pinion gear 3431 and a second pinion gear 3432 that rotate together. The first pinion gear 3431 may mesh with a ring gear 344. The second pinion gear 3432 meshes with the sun gear 341. The second pinion gear 3432 may have a shorter axial length than the first pinion gear 3431.

In the present embodiment, the first pinion gear 3431 may be disposed on the first side A1 in the axial direction with respect to the second pinion gear 3432. Each of the second pinion gear 3432 and the first pinion gear 3431 rotates (spins) on its own axis, and also rotates (revolves) around the sun gear 341 together with the carrier 342. A plurality of second pinion gears 3432 and a plurality of first pinion gears 3431 may be provided at intervals along their revolution trajectories. The carrier 342 may be connected to the transmission gear 3421 that meshes with the output gear 30, so as to rotate with the transmission gear 3421. The ring gear 344 may be fixed to the case 2.

The transmission mechanism 3 further includes a differential gear mechanism 5. The differential gear mechanism 5 distributes, to the pair of output members 6, the driving force transmitted from the rotating electrical machine 1 side. The differential gear mechanism 5 may be disposed coaxially with the pair of output members 6 (that is, on the second axis C2). The differential gear mechanism 5 distributes the driving force transmitted from the rotating electrical machine 1 side to the output gear 30 to the pair of output members 6. That is, the output gear 30 is drivingly connected to both of the pair of output members 6 via the differential gear mechanism 5. The differential gear mechanism 5 may be a bevel gear type differential gear mechanism, and the output gear 30 may be connected to a differential case portion 50 of the differential gear mechanism 5 so as to rotate with the differential case portion 50.

In the example shown in FIG. 2, the differential gear mechanism 5 distributes rotation of the output gear 30 to a first side gear 51 and a second side gear 52. The first side gear 51 rotates with the first output member 61, and the second side gear 52 rotates with the second output member 62. The first side gear 51 may be formed on a member different from a member constituting the first output member 61 (in this example, a shaft member), and may be connected (in this example, connected by splines) to the first output member 61 so as to rotate with the first output member 61. At least a part of the first output member 61 on the first side A1 in the axial direction may have a tubular shape (specifically, a cylindrical shape) extending in the axial direction A, and the first drive shaft 63 (see FIG. 1) may be inserted from the first side A1 in the axial direction into the first output member 61 (space surrounded by an inner peripheral surface). The second output member 62 may be connected to the second side gear 52. The second output member 62 may be implemented by the second drive shaft 64.

In the present embodiment, the output gear 30 of the differential gear mechanism 5 is preferably disposed near an end of the case 2 on the second side A2 in the axial direction. In this case, a gear (not shown) of the speed reduction mechanism 34 that meshes with the output gear 30 may be disposed furthest to the second side A2 in the axial direction in the speed reduction mechanism 34. In this case, the output gear 30 can be disposed closer to the second side A2 in the axial direction in the entire vehicle drive device 100.

In the present embodiment, the case 2 includes a motor case portion 21, a transmission mechanism case portion 22, an output shaft case portion 23, and the inverter case portion 24, all in an integrated form. As used herein, the "integrated form" includes a combined form obtained using a fastening member such as bolts, and a single-piece form obtained by integral molding (e.g., casting or casting using aluminizing etc.).

The motor case portion 21 forms a motor housing chamber S1 that houses the rotating electrical machine 1. The transmission mechanism case portion 22 forms a transmission mechanism housing chamber S2 that houses the transmission mechanism 3. The output shaft case portion 23 forms a output shaft housing chamber S3 that houses the first output member 61. The inverter case portion 24 forms an inverter housing chamber S4 that houses the inverter device 90. The "motor case portion 21 forms the motor housing chamber S1" means that a wall that serves as a boundary of the motor housing chamber S1 forms the motor case portion 21. The same applies to the transmission mechanism housing chamber S2, the output shaft case portion 23, and the inverter case portion 24.

The motor case portion 21 is in a cylindrical form conforming to the outer shape of the rotating electrical machine 1. However, the cylindrical outer periphery of the motor case portion 21 does not need to be completely closed. For example, the motor housing chamber S1 and the output shaft housing chamber S3 may communicate with each other. In this case, the motor case portion 21 may not have a wall (partition wall) on the side facing the output shaft housing chamber S3.

The transmission mechanism case portion 22 is provided on the second side A2 in the axial direction with respect to the motor case portion 21 and the output shaft case portion 23. The output shaft case portion 23 is provided on a second side X2 in a first direction with respect to the motor case portion 21. The inverter case portion 24 is provided above the transmission mechanism case portion 22 and the output shaft case portion 23. The inverter case portion 24 will be described in detail later.

In the present embodiment, since there is the output shaft case portion 23, the first output member 61 can be more effectively protected from the external environment (e.g., flying stones etc.) compared to the case where the first output member 61 is provided outside the case 2. Moreover, clearance that should be provided between the first output member 61 and peripheral components can be reduced. In a modification, however, the first output member 61 may be provided outside the case 2.

The case 2 may be formed by joining a plurality of members (case member and cover member). Therefore, one case member that forms the case 2 may form two or more case portions out of the motor case portion 21, the transmission mechanism case portion 22, the output shaft case portion 23, and the inverter case portion 24.

The motor housing chamber S1, the transmission mechanism housing chamber S2, the output shaft housing chamber S3, and the inverter housing chamber S4 that are formed by the case 2 may be completely separate chambers, may partially communicate with each other, or may form a common housing chamber with no boundaries therebetween. For example, the motor housing chamber S1 and the output shaft housing chamber S3 may form a common housing chamber with no partition wall separating them from each other. In this case, the rotating electrical machine 1 and the first output member 61 are housed in the common housing chamber (specifically, the motor housing chamber S1 and the output shaft housing chamber S3) formed by the case 2. When the rotating electrical machine 1 is of an oil-cooled type, the motor housing chamber S1 and the inverter housing chamber S4 may be separated by a partition. However, when the rotating electrical machine 1 is of a water-cooled type, the motor housing chamber S1 and the inverter housing chamber S4 may not be separated by a partition.

In the following description, as an example, it is assumed that the case 2 is formed by joining a case member 200, a motor cover member 201, a differential cover member 202, and the inverter cover member 203. The joining method may be fastening with bolts etc.

The case member 200 may be formed as a single-piece member (e.g., a single member formed by die casting and made of the same material). In this case, the motor housing chamber S1 and the transmission mechanism housing chamber S2 may be separated by a single partition wall 26.

The case member 200 is open in the axial direction A on the first side A1 in the axial direction and is open in the axial direction A on the second side A2 in the axial direction.

The motor cover member 201 is provided so as to cover an opening of the case member 200 on the first side A1 in the axial direction (that is, an opening of the motor housing chamber S1 on the first side A1 in the axial direction). The motor cover member 201 may be formed as a single-piece member. The motor cover member 201 may be joined to an end face (joint surface) of the case member 200 on the first side A1 in the axial direction. In this case, a joint surface (mating surface) 221 between the motor cover member 201 and the case member 200 may extend in a plane perpendicular to the axial direction A.

The differential cover member 202 is provided so as to cover an opening of the case member 200 on the second side A2 in the axial direction (that is, an opening of the transmission mechanism housing chamber S2 on the second side A2 in the axial direction). The differential cover member 202 may be formed as a single-piece member. The differential cover member 202 may be joined to an end face (joint surface) of the case member 200 on the second side A2 in the axial direction. In this case, a joint surface (mating surface) 222 between the differential cover member 202 and the case member 200 may extend in a plane perpendicular to the axial direction A.

The inverter cover member 203 is provided so as to cover an opening of the inverter housing chamber S4 in the case member 200. The inverter cover member 203 may be formed as a single-piece member.

The inverter device 90 may be in the form of a module, and may be fixed with bolts etc. to a wall forming the inverter case portion 24. The inverter device 90 includes: a power module PM (described later) including a plurality of switching elements (power semiconductor elements, not shown) constituting an inverter circuit; a control board 900 (see FIG. 14) on which a control device for controlling the inverter circuit is mounted; a smoothing capacitor CM (described later) that smooths a voltage between positive and negative electrodes on the direct current side of the inverter circuit; and a busbar structure 70. The inverter device 90 may further include various sensors such as a current sensor, a filter such as a Y-capacitor 906 (see FIG. 14), and various wires (including connectors etc.) (see FIG. 14). The inverter device 90 may include a coolant channel for cooling the power module PM. The smoothing capacitor CM may be in the form of a module in which a plurality of capacitor elements and terminals are molded with resin.

The busbar structure 70 is a wiring portion that electrically connects the rotating electrical machine 1 and the power module PM. The busbar structure 70 includes, for each phase of the rotating electrical machine 1, a first terminal portion 71 connected to a power line (not shown) of the rotating electrical machine 1, a second terminal portion 72 electrically connected to the power module PM, and a busbar 73 extending between the first terminal portion 71 and the second terminal portion 72. The busbar structure 70 will be described later in more detail.

As shown in FIG. 3, a direction in which the inverter device 90 are disposed next to each other as viewed in an axial direction along the axial direction A is defined as a first direction X, and a direction perpendicular to both the axial direction A and the first direction X is defined as a second direction Y. One side in the first direction X will be referred to as first side X1 in the first direction, and the other side in the first direction X (opposite side in the first direction X from the first side X1 in the first direction) will be referred to as second side X2 in the first direction. One side in the second direction Y will be referred to as first side Y1 in the second direction, and the other side in the second direction Y (opposite side in the second direction Y from the first side Y1 in the second direction) will be referred to as second side Y2 in the second direction. The first side X1 in the first direction is the side on which the rotating electrical machine 1 is disposed with respect to the inverter device 90 in the first direction X.

In the following description, it is assumed that the second direction includes a component in an up-down direction. In this case, the second direction may be parallel to or tilted with respect to the direction of gravity (vertical direction) when the vehicle drive device 100 is mounted on the vehicle VC. For example, the vehicle drive device 100 may be mounted on the vehicle VC in such an orientation that the first side Y1 in the second direction is the upper side V1 and the second side Y2 in the second direction is the lower side V2. The vehicle drive device 100 may be mounted on the vehicle VC in such an orientation that the first side X1 in the first direction is a front side L1 (front side in a vehicle front-rear direction L) and the second side X2 in the first direction is a rear side L2 (rear side in the vehicle front-rear direction L). As shown in FIG. 1, the vehicle drive device 100 may be mounted on the front side L1 with respect to the middle of the vehicle VC in the vehicle front-rear direction L. In the case where the vehicle drive device 100 is mounted on the rear side L2 with respect to the middle of the vehicle VC in the vehicle front-rear direction L, the vehicle drive device 100 can be mounted on the vehicle VC in such an orientation that the first side X1 in the first direction is the rear side L2 and the second side X2 in the first direction is the front side L1. This allows the inverter device 90 to be disposed closer to the middle in the vehicle front-rear direction L than the rotating electrical machine 1. In the case where the vehicle drive device 100 is thus mounted on the rear side L2 with respect to the middle in the vehicle front-rear direction L of the vehicle VC, the pair of wheels W to be driven by the vehicle drive device 100 may be, for example, the pair of right and left rear wheels.

In the case where the vehicle VC includes the pair of right and left front wheels and the pair of right and left rear wheels, either the pair of right and left front wheels or the pair of right and left rear wheels, whichever is not driven by the vehicle drive device 100 (in the example shown in FIG. 1, the pair of right and left rear wheels), may be driven by a drive device other than the vehicle drive device 100. The drive device other than the vehicle drive device 100 is, for example, a drive device configured to transmit output torque of an internal combustion engine (example of a driving force source other than a rotating electrical machine) to the pair of wheels to be driven by the drive device, a drive device configured to transmit output torque of a rotating electrical machine (rotating electrical machine different from the rotating electrical machine 1 of the vehicle drive device 100) to the pair of wheels to be driven by the drive device, or a drive device configured to transmit both the output torque of the internal combustion engine and the output torque of the rotating electrical machine (rotating electrical machine different from the rotating electrical machine 1 of the vehicle drive device 100) to the pair of wheels to be driven by the drive device. The drive device other than the vehicle drive device 100 may be a drive device having the same configuration as the vehicle drive device 100.

Of the vehicle drive device 100, the rotating electrical machine 1 may have the largest size in the second direction Y as viewed in the axial direction. The size of the rotating electrical machine 1 is determined by required output etc. Therefore, in order to reduce the overall size of the vehicle drive device 100 in the second direction, it is useful to arrange main components of the vehicle drive device 100 (main components other than the rotating electrical machine 1) such that they overlap the rotating electrical machine 1 as viewed in the first direction X. Particularly in the case where the vehicle drive device 100 includes the output gear 30 with a relatively large outer diameter, the positional relationship between the output gear 30 and the rotating electrical machine 1 may significantly affect the overall size of the vehicle drive device 100 in the second direction.

In view of this, the pair of output members 6 concentric with the central axis of the output gear 30 is preferably disposed so as to overlap the rotor shaft 15 of the vehicle drive device 100 as viewed in the first direction. In this case, the positional relationship between the output gear 30 and the rotating electrical machine 1 may be set such that the outer shape (e.g., a circular outer shape portion) of the output member 6 overlaps the outer shape (e.g., a circular outer shape portion) of the rotor shaft 15 as viewed in the first direction. Arranging the output gear 30 and the rotating electrical machine 1 in such a positional relationship can reduce or eliminate the influence of the output gear 30 on the overall size of the vehicle drive device 100 in the second direction Y. That is, since the overall size of the vehicle drive device 100 in the second direction is substantially determined by the size of the rotating electrical machine 1 (and therefore the size of the motor case portion 21), the overall size of the vehicle drive device 100 in the second direction Y can be minimized under the condition of the same size of the rotating electrical machine 1.

Next, a characteristic configuration regarding the placement and wiring structure (three-phase wiring structure) of the inverter device 90 according to the present embodiment will be described with further reference to FIG. 3 and the subsequent figures.

Figure 5:
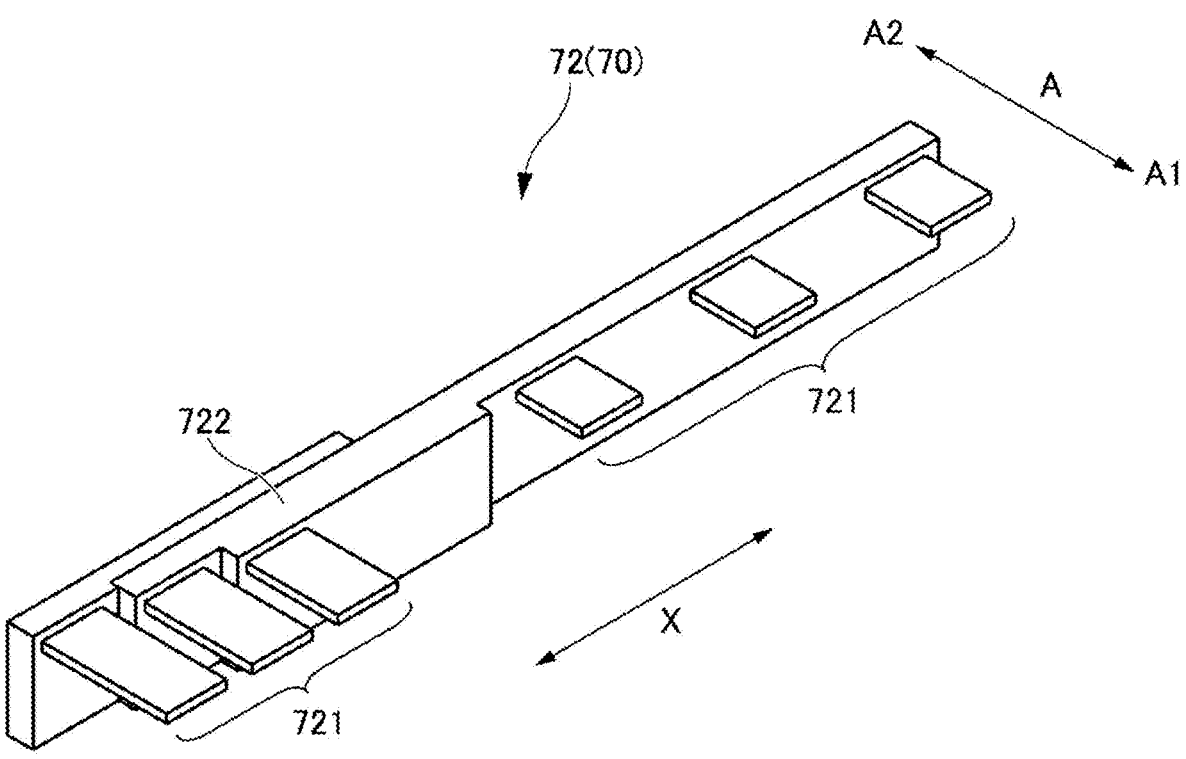
FIG. 5 is a perspective view of a second terminal portion of a busbar structure in the vehicle drive device of the embodiment.

FIG. 5 is a perspective view of the second terminal portion 72 of the busbar structure 70 in the vehicle drive device 100 of the present embodiment.

As described above, the inverter device 90 is housed in the inverter housing chamber S4 in the inverter case portion 24. The inverter device 90 mainly includes the power module PM, the smoothing capacitor CM, and the busbar structure 70. In FIG. 3, the region where the power module PM and the smoothing capacitor CM are disposed is shown by a portion 300 enclosed by a long dashed short dashed line.

In the present embodiment, the inverter case portion 24 is disposed so as to overlap the first axis C1 and the second axis C2 as viewed from above (as viewed in the second direction Y, the same applies hereinafter).

The inverter housing chamber S4 includes a first housing portion S41, a second housing portion S42, and a third housing portion S43. In the following description of arrangement of the first housing portion S41, the second housing portion S42, and the third housing portion S43, part or all of the space between a line P1 and a line P2 in the up-down direction in which no components other than the inverter case portion 24 is disposed will be sometimes referred to as "dead space."

As shown in FIG. 3, the inverter housing chamber S4 is in the form of an L-shape as viewed from above. Specifically, when the center in the X-direction is between the first axis C1 and the second axis C2 in the X-direction, the inverter housing chamber S4 extends on both sides in the X-direction with respect to the center in the X-direction so as to extend across the center in the X-direction. When the center in the A-direction is between the rotating electrical machine 1 and the speed reduction mechanism 34 in the A-direction, the inverter housing chamber S4 on the second side X2 in the first direction extends on both sides in the A-direction with respect to the center in the A-direction so as to extend across the center in the A-direction. On the other hand, the inverter housing chamber S4 on the first side X1 in the first direction extends only on the second side A2 in the axial direction with respect to the center in the A-direction.

More specifically, as shown in FIG. 3, the first housing portion S41, the second housing portion S42, and the third housing portion S43 are arranged in an L-shape as a whole as viewed from above. In this case, the first housing portion S41 overlaps the first axis C1 (i.e., the speed reduction mechanism 34) on the second side A2 in the axial direction as viewed from above, and overlaps the rotating electrical machine 1 as viewed in the axial direction A. The second housing portion S42 overlaps the second axis C2 as viewed from above, and overlaps the rotating electrical machine 1 as viewed in the first direction X. The third housing portion S43 is adjacent to the first housing portion S41 and the second housing portion S42, and overlaps the second axis C2 as viewed from above. The third housing portion S43 may integrally communicate with the first housing portion S41 and the second housing portion S42.

The first housing portion S41, the second housing portion S42, and the third housing portion S43 are disposed above a plane PL10 (see FIG. 4) that includes the first axis C1 and the second axis C2. In the present embodiment, as described above, the amount of offset in the second direction Y between the central axis of the output gear 30 (i.e., the second axis C2) and the central axis of the rotating electrical machine 1 (i.e., the first axis C1) is set relatively small. Therefore, the plane PL10 is a plane close to a horizontal plane.

The first housing portion S41, the second housing portion S42, and the third housing portion S43 are preferably formed so as not to affect the overall size of the case 2 in the second direction Y in order to prevent an increase in overall size of the case 2. In the present embodiment, the overall size of the case 2 in the second direction Y is determined by the size of the rotating electrical machine 1 in the second direction Y (see lines P0 and P2 in FIG. 4), specifically, is determined by the size of the motor case portion 21 in the second direction Y. Therefore, the first housing portion S41, the second housing portion S42, and the third housing portion S43 are disposed on the second side Y2 in the second direction with respect to the position of the motor case portion 21 furthest to the first side Y1 in the second direction (see line P2 in FIG. 4). Specifically, the case 2 includes a sidewall 240 that separates the inverter housing chamber S4 (first housing portion S41, second housing portion S42, and third housing portion S43) from the motor housing chamber S1 in a direction perpendicular to the Y-direction, and the sidewall 240 extends on the second side Y2 in the second direction with respect to the highest position of the motor case portion 21 (line P2). In this case, the overall size of the case 2 in the second direction Y can be reduced. An end face of the sidewall 240 on the first side Y1 in the second direction may extend in the same plane perpendicular to the second direction Y, and may form a mating surface to which the inverter cover member 203 is attached. In this case, the inverter cover member 203 may also be disposed on the second side Y2 in the second direction with respect to the highest position of the motor case portion 21 (line P2). Regarding the sidewall 240, "separating the inverter housing chamber S4 from the motor housing chamber S1 in a direction perpendicular to the Y-direction" means forming a boundary between the inverter housing chamber S4 and the motor housing chamber S1 in a direction perpendicular to the Y-direction (X-direction, A-direction, or any combination of these directions). In this case, the boundary position (boundary position in the X-direction, boundary position in the A-direction, or boundary position in any combination of these directions) does not need to be constant at each position in the Y-direction. For example, of the sidewall 240, the position of a sidewall portion, namely a portion that separates the second housing portion S42 from the motor housing chamber S1, in the X direction may be located closer to the X1 side as it gets closer to the Y1 side in the Y-direction, so as to conform to the outer shape of the rotating electrical machine 1.

The first housing portion S41, the second housing portion S42, and the third housing portion S43 are preferably disposed between both end faces of the case member 200 in the axial direction A. That is, the first housing portion S41, the second housing portion S42, and the third housing portion S43 are preferably disposed between the joint surface (mating surface) 221 between the motor cover member 201 and the case member 200 and the joint surface (mating surface) 222 between the differential cover member 202 and the case member 200 in the axial direction A. In this case, it is easy to arrange the first housing portion S41, the second housing portion S42, and the third housing portion S43 in a manner that does not affect the size in the axial direction A.

The first housing portion S41, the second housing portion S42, and the third housing portion S43 are preferably formed so as not to affect the overall size of the case 2 in the first direction X in order to prevent an increase in overall size of the case 2. In the present embodiment, regarding the overall size of the case 2 in the first direction X, the boundary (outer shape) on the second side X2 in the first direction is determined by the size of the differential gear mechanism 5, specifically, is determined by the size of the transmission mechanism case portion 22 in the first direction X. Regarding the overall size of the case 2 in the first direction X, the boundary (outer shape) on the first side X1 in the first direction is determined by the size of the rotating electrical machine 1.

As described above, according to the present embodiment, it is possible to reduce the overall sizes of the vehicle drive device 100 in the first direction X and the second direction Y. That is, it is possible to reduce the dimensions of the vehicle drive device 100 as viewed in the axial direction. As a result, ease of mounting of the vehicle drive device 100 on the vehicle VC can be improved.

The first housing portion S41 and the third housing portion S43 may have any dimension in the Y-direction and may have the same dimension in the Y-direction, as long as the first housing portion S41 and the third housing portion S43 are disposed on the second side Y2 in the second direction with respect to the line P2 described above. For example, the first housing portion S41 and the third housing portion S43 may be designed to have different according to the components (described later) of the inverter device 90 that are housed in each of these housing portions. In the present embodiment, as an example, the size of the rotating electrical machine 1 is larger than the size of the output gear 30 as viewed in the axial direction. Therefore, dead space (space on the second side Y2 in the second direction with respect to the line P2) is more likely to be formed in a region around the first axis C1 on the second side A2 in the axial direction with respect to the center in the A-direction than in a region around the second axis C2 on the second side A2 in the axial direction with respect to the center in the A-direction. Accordingly, the dimension (e.g., maximum dimension or average dimension) of the third housing portion S43 in the second direction Y may be preferably set larger than the dimension of the motor housing chamber S1 in the second direction. The second housing portion S42 and the third housing portion S43 can be formed by efficiently using the space around the second axis C2 on the second side Y2 in the second direction with respect to the line P2.

The first housing portion S41, the second housing portion S42, and the third housing portion S43 may have any dimension in the Y-direction and may have the same dimension in the Y-direction, as long as the first housing portion S41, the second housing portion S42, and the third housing portion S43 are located on the second side Y2 in the second direction with respect to the highest position of the motor case portion 21 (line P2). However, the first housing portion S41, the second housing portion S42, and the third housing portion S43 may be designed to have different dimensions in the Y-direction according to the components (described later) of the inverter device 90 that are housed in each of them. In other words, the components to be disposed in each of the first housing portion S41, the second housing portion S42, and the third housing portion S43 may be determined according to the maximum possible dimensions of the first housing portion S41, the second housing portion S42, and the third housing portion S43 in the Y-direction.

In this regard, in the present embodiment, the busbar structure 70 is disposed in the first housing portion S41, the smoothing capacitor CM is disposed in the second housing portion S42, and the power module PM is disposed in the third housing portion S43 among the components of the inverter device 90. In this case, the busbar structure 70 and the power module PM are adjacent to each other in the first direction X, and the power module PM and the smoothing capacitor CM are adjacent to each other in the axial direction A. The boundaries between the first housing portion S41, the second housing portion S42, and the third housing portion S43 do not need to be rigid. For example, part of the power module PM on the first side A1 in the axial direction may be disposed in the second housing portion S42, and part of the power module PM on the first side X1 in the first direction may be disposed in the first housing portion S41.

In the present embodiment, the speed reduction mechanism 34 disposed on the second side Y2 in the second direction with respect to the first housing portion S41 includes a planetary gear mechanism, and the mounting space around the first axis C1 (mounting space for the speed reduction mechanism 34) is relatively large. For example, in terms only of the first side A1 in the axial direction with respect to the output gear 30 of the differential gear mechanism 5, the mounting space for the differential gear mechanism 5 tends to be smaller than the mounting space for the planetary gear mechanism.

In view of this, in the present embodiment, the busbar structure 70 that requires a relatively small mounting space (dimension) in the second direction Y is disposed in the first housing portion S41. In the present embodiment, the busbar structure 70 is disposed in such a manner that the first terminal portions 71 of the three phases are located next to each other in the first direction X, and the busbars 73 of the three phases extend in the axial direction A so as not to overlap each other (so as to be located next to each other in the first direction X) as viewed in the up-down direction. Each of the ends of the busbars 73 of the three phases on the first side A1 in the axial direction is joined to a corresponding one of the first terminal portions 71. This allows the busbars 73 of the three phases to be easily disposed even when the dead space in the mounting area has a relatively small dimension in the second direction Y. As a result, the size of the case 2 can be reduced.

In the present embodiment, the first terminal portions 71 are formed so as to extend in the axial direction A through a part of the sidewall 240 that separates the motor housing chamber S1 and the first housing portion S41 (see, for example, the first terminal portions 71 shown by dashed lines in FIG. 4). This allows the power lines (three-phase wires) of the rotating electrical machine 1 to be routed a relatively short distance from the motor housing chamber S1 to the inverter housing chamber S4. This reduces the wiring space compared to the case where the power lines are routed to the inverter housing chamber S4 via the output shaft housing chamber S3 etc. As a result, the size of the case 2 can be reduced. As shown in FIG. 4, the first terminal portions 71 together with the busbars 73 overlap the rotating electrical machine 1 as viewed in the axial direction (i.e., are disposed in the dead space described above). The first terminal portions 71 and the busbars 73 do not overlap the output member 6 as viewed in the second direction Y. In FIG. 4, the positions of the first terminal portions 71 as viewed in the axial direction are schematically shown by dashed lines.

In the present embodiment, as an example, the size (radial size) of the output gear 30 is significantly larger than the size of the output member 6 as viewed in the axial direction. Therefore, in a region around the second axis C2, dead space (space on the second side Y2 in the second direction with respect to the line P2) is more likely to be formed on the first side A1 in the axial direction than on the second side A2 in the axial direction. Accordingly, the dimension (e.g., maximum dimension or average dimension) of the second housing portion S42 in the second direction Y can be set larger than the dimension of the third housing portion S43 in the second direction Y.

In view of this, in the present embodiment, the smoothing capacitor CM is disposed in the second housing portion S42, and the power module PM is disposed in the third housing portion S43, as described above. Accordingly, even when the smoothing capacitor CM has a larger dimension in the axial direction A than the power module PM, the smoothing capacitor CM can be easily placed in the second housing portion S42 that can be designed to have a relatively large dimension in the second direction Y. As described above, according to the present embodiment, the smoothing capacitor CM and the power module PM can be efficiently arranged by efficiently using the dead space around the second axis C2 on the second side Y2 in the second direction with respect to the line P2.

In the present embodiment, as shown in FIG. 3, a connector CN1 for a high-voltage wire (power supply wire) through which the inverter device 90 receives electric power from the high-voltage battery BA (see FIG. 1) may be provided on the first side A1 of the second housing portion S42 in the axial direction. That is, the connector CN1 may be provided on a part of the sidewall 240 that serves as a boundary of the first side A1 of the second housing portion S42 in the axial direction. In this case, it is possible to efficiently set a current path from the high-voltage battery BA through the smoothing capacitor CM, the power module PM, and the busbar structure 70 to the rotating electrical machine 1. That is, the current path from the high-voltage battery BA to the rotating electrical machine 1 is a C-shaped path (path in the axial direction A on the second side X2 in the first direction, path in the first direction X on the second side A2 in the axial direction, and path in the axial direction A on the first side X1 in the first direction) as viewed in the second direction Y. An efficient path that substantially does not include any unnecessary paths such as turning back can thus be implemented. In a modification, the connector CN1 may be disposed on a part of the sidewall 240 that serves as a boundary of the second side X2 of the second housing portion S42 in the first direction (i.e., the second side X2 in the first direction and the first side A1 in the axial direction of the inverter case portion 24). In this case as well, an efficient path that substantially does not include any unnecessary paths such as turning back can be implemented.

In the present embodiment, as described above, the dead space around the second axis C2 gradually increases from the second side A2 in the axial direction toward the first side A1 in the axial direction. Accordingly, the dimension of the inverter case portion 24 (particularly the second housing portion S42 and the third housing portion S43) for the inverter device 90 in the second direction Y can also be gradually increased from the second side A2 in the axial direction toward the first side A1 in the axial direction without changing the position of the inverter case portion 24 furthest to the first side Y1 in the second direction. In this case, various components of the inverter device 90 may be distributed and disposed in the second housing portion S42 and the third housing portion S43 of the inverter case portion 24 in such a manner that a component located on the first side A1 in the axial direction has a greater dimension in the second direction Y than a component located on the second side A2 in the axial direction. In the present embodiment, since the smoothing capacitor CM has a larger dimension in the second direction Y than the power module PM, the smoothing capacitor CM is disposed in the second housing portion S42, and the power module PM is disposed in the third housing portion S43.

In the differential gear mechanism 5, the output gear 30 tends to have the largest size around the second axis C2 among the components of the differential gear mechanism 5. Therefore, in the case where the output gear 30 of the differential gear mechanism 5 is disposed more on the second side A2 in the axial direction, the space on the first side A1 in the axial direction with respect to the output gear 30 out of the space about the second axis C2 can be relatively large in the radial direction and continuous in the axial direction A. Accordingly, other components can be efficiently arranged.

In this regard, in the present embodiment, the second terminal portion 72 is disposed on the first side A1 in the axial direction with respect to the output gear 30, and is connected to the power module PM on the second side A2 of the power module PM in the axial direction. The second terminal portion 72 can thus be efficiently disposed using the dead space that can be easily secured on the first side A1 in the axial direction with respect to the output gear 30. As a result, the size of the case 2 can be reduced.

As shown in FIG. 5, the second terminal portion 72 may be in such a form that it includes terminal-side busbars 721 of the three phases inside a resin portion 722. The terminal-side busbars 721 extend in the first direction X. An end of each terminal-side busbar 721 on the first side X1 in the first direction is joined to a corresponding one of the busbars 73 of the three phases, and an end of each terminal-side busbar 721 on the second side X2 in the first direction is joined to a terminal portion of the power module PM. The terminal-side busbars 721 may extend in the first direction X inside the resin portion 722 in such a manner that a direction perpendicular to flat plates coincides with the axial direction A. In this case, the second terminal portion 72 can be disposed even when the space in the axial direction A is relatively small. In the case where a part of the second terminal portion 72 on the second side X2 in the first direction (part located inside the resin portion 722 described later) is disposed in such a manner that the direction perpendicular to the flat plates coincides with the axial direction A, only a relatively small space (space corresponding to the thickness of the flat plates) is required in the axial direction, but a relatively large space (dimension of the flat plates in the width direction) is required in the second direction Y.

In the present embodiment, however, the part of the second terminal portion 72 on the second side X2 in the first direction (part located inside the resin portion 722) can be efficiently disposed using the relatively large dead space in the second direction Y that can be easily secured on the first side A1 in the axial direction with respect to the output gear 30. For example, the part of the second terminal portion 72 on the second side X2 in the first direction (part located inside the resin portion 722 described later) may be disposed on the first side A1 in the axial direction with respect to the output gear 30 and near the axial position of the joint surface (mating surface) 222 between the differential cover member 202 and the case member 200 (e.g., on the second side A2 in the axial direction or the first side A1 in the axial direction with respect to the mating surface 222). In this case, the part of the second terminal portion 72 on the second side X2 in the first direction can be efficiently disposed. As a result, as described above, the ends on the second side A2 in the axial direction of the three busbars 73 extending in the axial direction A can be efficiently connected to the power module PM by using the second terminal portion 72.

Next, some modifications of the above embodiment will be described with reference to FIGS. 6 to 10. The following description focuses on components different from those of the above embodiment, and the other components may be the same as those of the above embodiment. Therefore, in the following description, components that may be the same as those of the above embodiment (and components that are different only in their positions from those of the above embodiment) may be denoted by the same signs as those of the above embodiment, and description thereof may be omitted.

Figure 6:
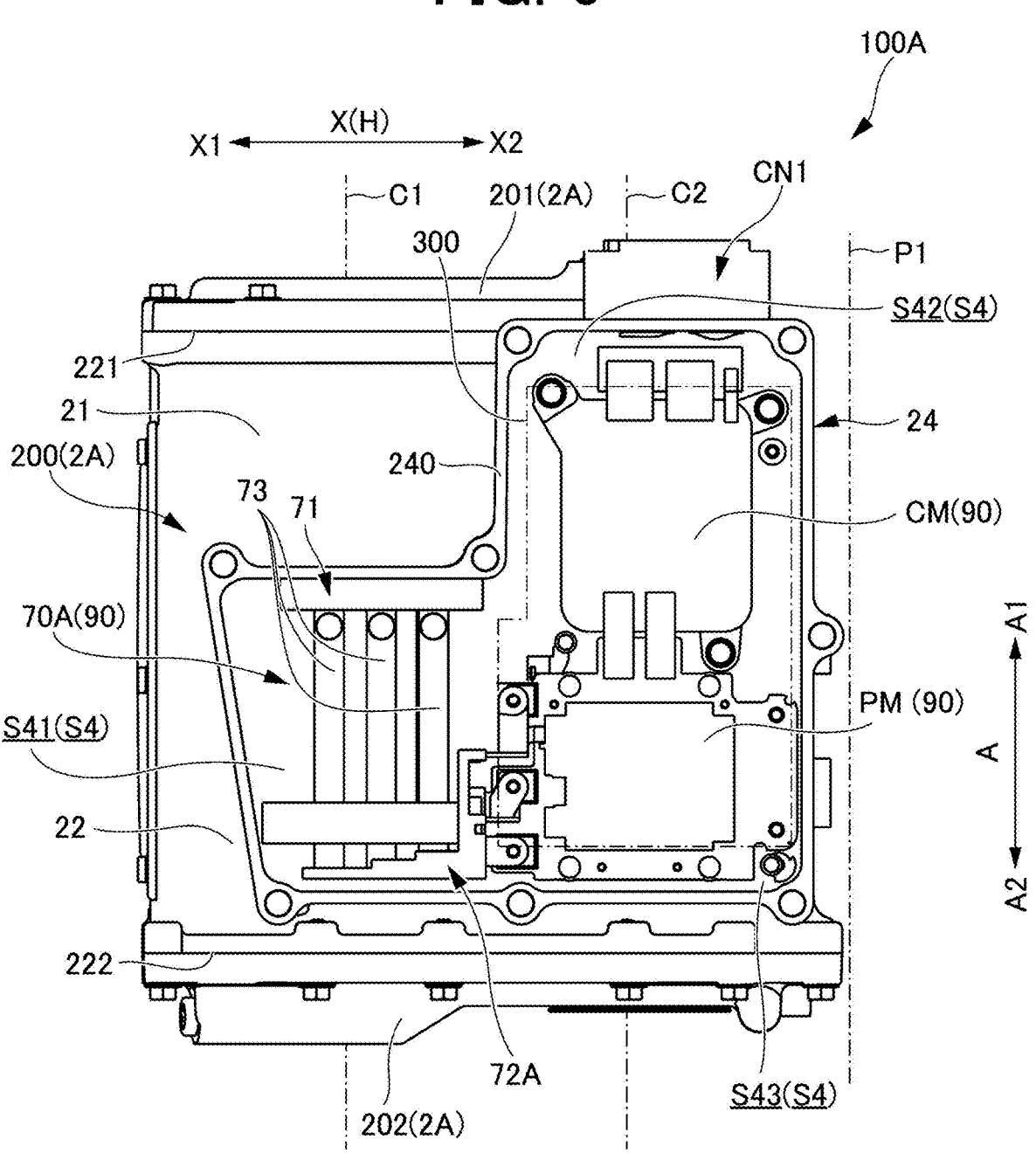
FIG. 6 is a top view of a vehicle drive device according to a first modification.
Figure 7:
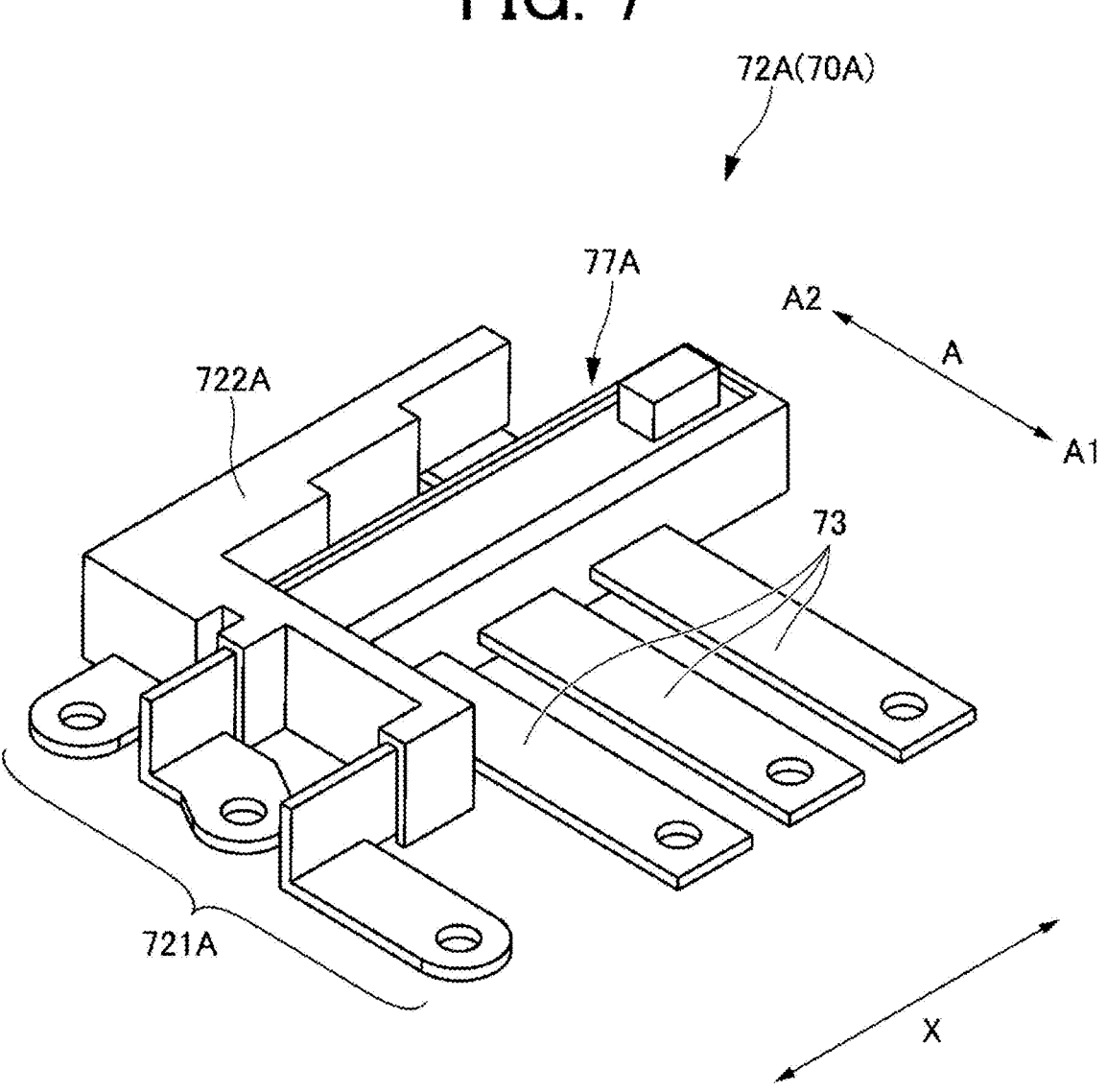
FIG. 7 is a perspective view of a second terminal portion of a busbar structure in the vehicle drive device of the first modification.

FIG. 6 is a top view of a vehicle drive device 100A according to a first modification, and FIG. 7 is a perspective view of a second terminal portion 72A of a busbar structure 70A of the vehicle drive device 100A according to the first modification.

The vehicle drive device 100A according to the first modification is different from the vehicle drive device 100 according to the above embodiment mainly in that the busbar structure 70 is replaced with the busbar structure 70A.

The busbar structure 70A according to the first modification is different from the busbar structure 70A according to the above embodiment mainly in that the second terminal portion 72 is replaced with the second terminal portion 72A.

Specifically, the busbar structure 70A according to the first modification is in such a form that it includes terminal-side busbars 721A of the three phases inside a resin portion 722A. The busbar structure 70A includes an L-shaped portion in which the terminal-side busbars 721A are arranged so as not to overlap each other as viewed in the up-down direction. Specifically, the terminal-side busbars 721A of the second terminal portion 72A extend in the first direction X. On the second side X2 in the first direction, the terminal-side busbars 721A are connected to or continuous with the ends of the busbars 73 of the three phases on the second side A2 in the axial direction. On the first side X1 in the first direction, the terminal-side busbars 721A are connected to the power module PM. The terminal-side busbars 721A of the second terminal portion 72A and the busbars 73 of the three phases form an L-shape as a whole as viewed from above. In this case, the terminal-side busbars 721A of the second terminal portion 72A and the busbars 73 of the three phases may extend substantially in the same plane perpendicular to the second direction Y. This allows the busbar structure 70A to be efficiently disposed using the relatively small dead space in the second direction Y in the first housing portion S41. As a result, the size of the case 2 can be reduced. The busbar structure 70A (and the busbar structure 70) may include a current sensor 77A. That is, the current sensor 77A that detects a current of each phase may be disposed using the first housing portion S41.

In the first modification, the busbar structure 70A is substantially disposed only in the first housing portion S41. In the above embodiment, the second terminal portion 72, namely a part of the busbar structure 70, is disposed in the third housing portion S43. As described above, the busbar structure 70 may be disposed not only in the first housing portion S41 but also by appropriately using the third housing portion S43.

The first modification also has the same effects as those of the above embodiment.

Figure 8:
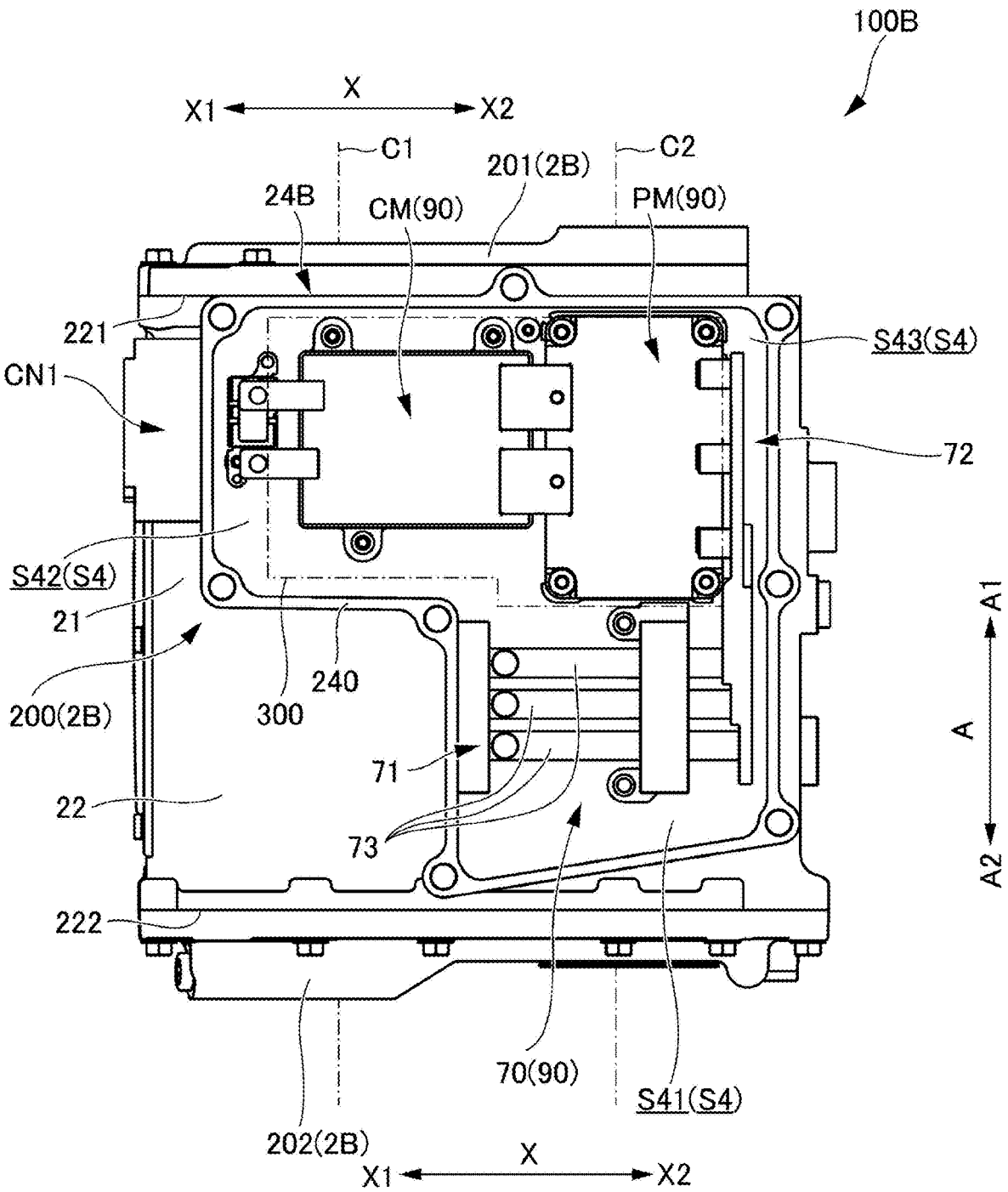
FIG. 8 is a top view of a vehicle drive device according to a second modification.

FIG. 8 is a top view of a vehicle drive device 100B according to a second modification.

The vehicle drive device 100B according to the second modification is different from the vehicle drive device 100 according to the above embodiment in that the case 2 is replaced with a case 2B. The case 2B is different from the case 2 described above in that the inverter case portion 24 is replaced with an inverter case portion 24B. The inverter case portion 24B has a shape and arrangement substantially rotated 90 degrees counterclockwise as viewed from above in FIG. 8 with respect to the shape and arrangement of the inverter case portion 24 according to the above embodiment.

Accordingly, the second modification is different from the above embodiment mainly in the arrangement of the power module PM, the smoothing capacitor CM, and the busbar structure 70 in the inverter housing chamber S4. That is, in the second modification, the arrangement of the power module PM, the smoothing capacitor CM, and the busbar structure 70 in the inverter housing chamber S4 is substantially rotated 90 degrees counterclockwise as viewed from above in FIG. 8 with respect to the arrangement according to the above embodiment.

Specifically, in the second modification, the first housing portion S41 according to the above embodiment is located at the same position as the third housing portion S43 according to the above embodiment, and the third housing portion S43 according to the above embodiment is located at the same position as the second housing portion S42 according to the above embodiment. The second housing portion S42 overlaps the rotating electrical machine 1 as viewed from above. In the second modification as well, as shown in FIG. 8, the first housing portion S41, the second housing portion S42, and the third housing portion S43 are arranged in an L-shape as a whole as viewed from above. In this case, the first housing portion S41 overlaps the second axis C2 (differential gear mechanism 5) on the second side A2 in the axial direction as viewed from above, the second housing portion S42 overlaps the first axis C1 (rotating electrical machine 1) on the first side A1 in the axial direction as viewed from above, and the third housing portion S43 overlaps the second axis C2 (output member 6) on the first side A1 in the axial direction as viewed from above.

The second modification is suitable when the speed reduction mechanism 34 has a relatively large radial size. In this case, the second housing portion S42 (and also the first housing portion S41 and the third housing portion S43) may overlap the speed reduction mechanism 34 as viewed in the axial direction A. In other words, the range in which the inverter housing chamber S4 extends in the up-down direction may overlap the range in which the speed reduction mechanism 34 extends in the up-down direction.

The second modification also has the same effects as those of the above embodiment. In the second modification as well, the sidewall 240 of the inverter case portion 24B can extend in a portion in a region of the case 2B where the inverter case portion 24B is not disposed as viewed from above (portion on the first side X1 in the first direction and the second side A2 in the axial direction). Namely, the sidewall 240 of the inverter case portion 24B can extend on the second side Y2 in the second direction (see FIG. 4) with respect to the highest position of the transmission mechanism case portion 22. In this case, the overall size of the case 2B in the second direction Y can be reduced.

In the second modification, as in the above embodiment, the busbar structure 70 is mainly disposed in the first housing portion S41, the smoothing capacitor CM is mainly disposed in the second housing portion S42, and the power module PM is mainly disposed in the third housing portion S43. However, the present disclosure is not limited to this. For example, the smoothing capacitor CM may be mainly disposed in the first housing portion S41, the busbar structure 70 may be mainly disposed in the second housing portion S42, and the power module PM may be mainly disposed in the third housing portion S43. In this case, the connector CN1 may be disposed on the first housing portion S41.

Figure 9:
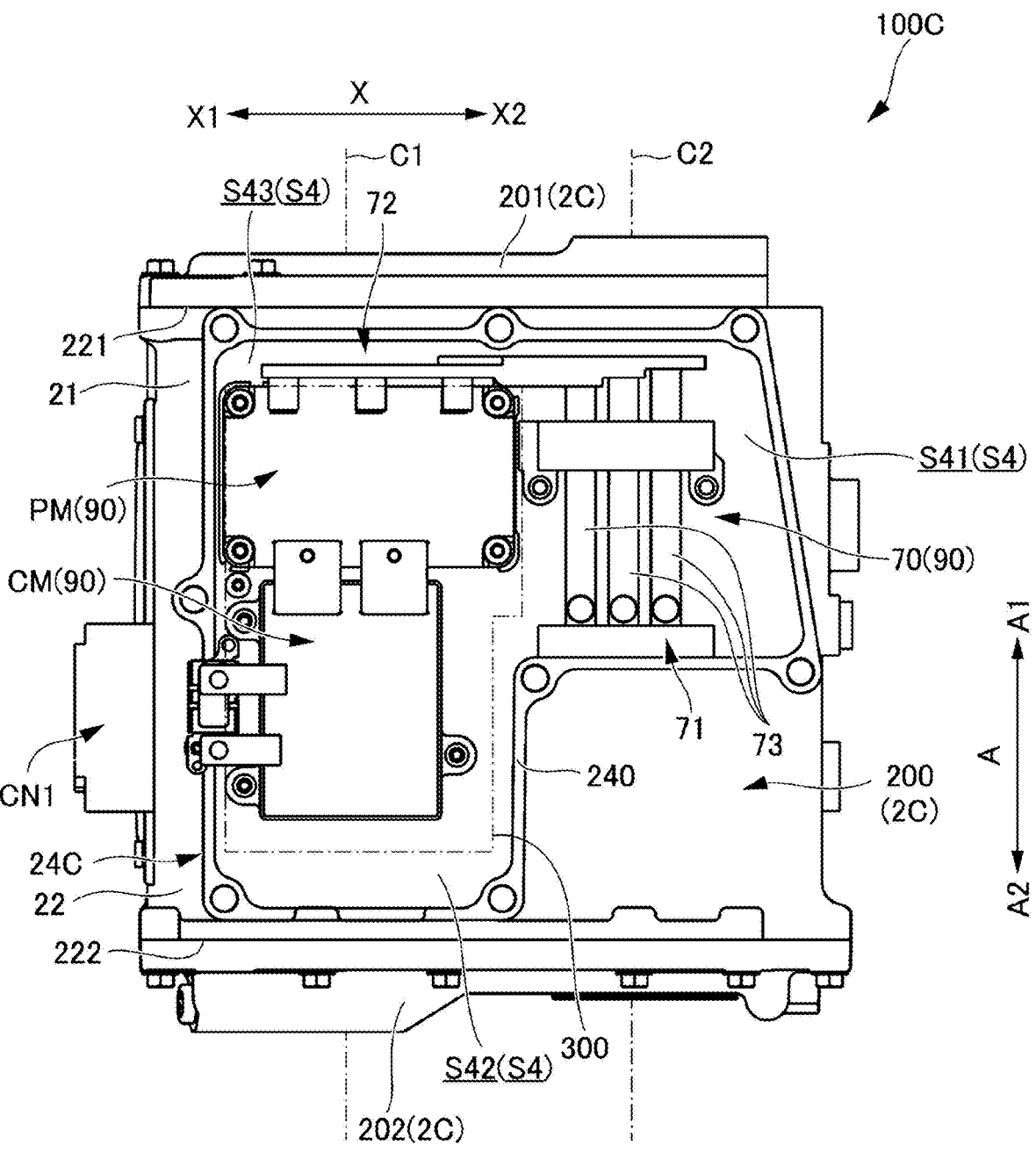
FIG. 9 is a top view of a vehicle drive device according to a third modification.

FIG. 9 is a top view of a vehicle drive device 100C according to a third modification.

The vehicle drive device 100C according to the third modification is different from the vehicle drive device 100 according to the above embodiment in that the case 2 is replaced with a case 2C. The case 2C is different from the case 2 described above in that the inverter case portion 24 is replaced with an inverter case portion 24C. The inverter case portion 24C has a shape and arrangement substantially rotated 180 degrees counterclockwise as viewed from above in FIG. 9 with respect to the shape and arrangement of the inverter case portion 24 according to the above embodiment.

Accordingly, the vehicle drive device 100C according to the third modification is different from the vehicle drive device 100 according to the above embodiment mainly in the arrangement of the power module PM, the smoothing capacitor CM, and the busbar structure 70 in the inverter housing chamber S4. That is, in the third modification, the arrangement of the power module PM, the smoothing capacitor CM, and the busbar structure 70 in the inverter housing chamber S4 is substantially rotated 180 degrees counterclockwise as viewed from above in FIG. 9 with respect to the arrangement according to the above embodiment.

Specifically, in the third modification, the first housing portion S41 according to the above embodiment is located at the same position as the second housing portion S42 according to the above embodiment, and the second housing portion S42 according to the above embodiment is located at the same position as the first housing portion S41 according to the above embodiment. The third housing portion S43 overlaps the rotating electrical machine 1 as viewed from above. In the third modification as well, as shown in FIG. 9, the first housing portion S41, the second housing portion S42, and the third housing portion S43 are arranged in an L-shape as a whole as viewed from above. In this case, the first housing portion S41 overlaps the second axis C2 (output member 6) on the first side A1 in the axial direction as viewed from above, the second housing portion S42 overlaps the first axis C1 (speed reduction mechanism 34) on the second side A2 in the axial direction as viewed from above, and the third housing portion S43 overlaps the first axis C1 (rotating electrical machine 1) on the first side A1 in the axial direction as viewed from above.

The third modification is suitable when the differential gear mechanism 5 has a relatively large radial size. In this case, the third housing portion S43 (and also the first housing portion S41 and the second housing portion S42) may overlap the differential gear mechanism 5 as viewed in the axial direction A. In other words, the range in which the inverter housing chamber S4 extends in the up-down direction may overlap the range in which the differential gear mechanism 5 extends in the up-down direction.

The third modification also has the same effects as those of the above embodiment. In the third modification as well, the sidewall 240 of the inverter case portion 24C can extend in a portion in a region of the case 2C where the inverter case portion 24C is not disposed as viewed from above (portion on the second side X2 in the first direction and the second side A2 in the axial direction). Namely, the sidewall 240 of the inverter case portion 24C can extend on the second side Y2 in the second direction (see FIG. 4) with respect to the highest position of the transmission mechanism case portion 22. In this case, the overall size of the case 2C in the second direction Y can be reduced.

In the third modification, as in the above embodiment, the busbar structure 70 is mainly disposed in the first housing portion S41, the smoothing capacitor CM is mainly disposed in the second housing portion S42, and the power module PM is mainly disposed in the third housing portion S43. However, the present disclosure is not limited to this. For example, the smoothing capacitor CM may be mainly disposed in the first housing portion S41, the busbar structure 70 may be mainly disposed in the second housing portion S42, and the power module PM may be mainly disposed in the third housing portion S43. In this case, the connector CN1 may be disposed on the first housing portion S41.

Figure 10:
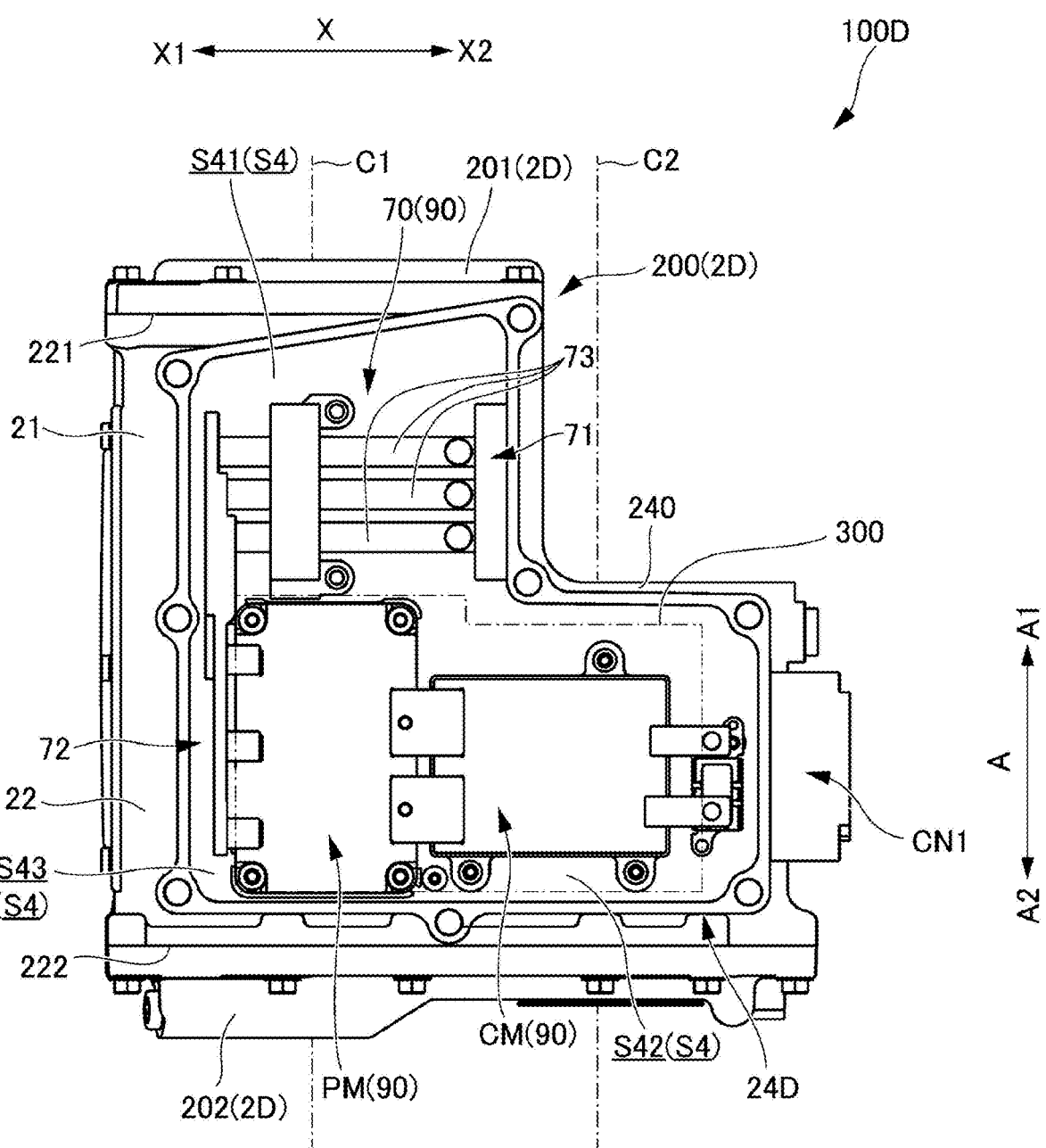
FIG. 10 is a top view of a vehicle drive device according to a fourth modification.

FIG. 10 is a top view of a vehicle drive device 100D according to a fourth modification.

The vehicle drive device 100D according to the fourth modification is different from the vehicle drive device 100 according to the above embodiment in that the case 2 is replaced with a case 2D. The case 2D is different from the case 2 described above in that the inverter case portion 24 is replaced with an inverter case portion 24D. The inverter case portion 24D has a shape and arrangement substantially rotated 270 degrees counterclockwise as viewed from above in FIG. 10 with respect to the shape and arrangement of the inverter case portion 24 according to the above embodiment.

Accordingly, the vehicle drive device 100D according to the fourth modification is different from the vehicle drive device 100 according to the above embodiment mainly in the arrangement of the power module PM, the smoothing capacitor CM, and the busbar structure 70 in the inverter housing chamber S4. That is, in the fourth modification, the arrangement of the power module PM, the smoothing capacitor CM, and the busbar structure 70 in the inverter housing chamber S4 is substantially rotated 270 degrees counterclockwise as viewed from above in FIG. 10 with respect to the arrangement according to the above embodiment.

Specifically, in the fourth modification, the second housing portion S42 according to the above embodiment is located at the same position as the third housing portion S43 according to the above embodiment, and the third housing portion S43 according to the above embodiment is located at the same position as the first housing portion S41 according to the above embodiment. The first housing portion S41 overlaps the rotating electrical machine 1 as viewed from above. In the fourth modification as well, as shown in FIG. 10, the first housing portion S41, the second housing portion S42, and the third housing portion S43 are arranged in an L-shape as a whole as viewed from above. In this case, the first housing portion S41 overlaps the first axis C1 (rotating electrical machine 1) on the first side A1 in the axial direction as viewed from above, the second housing portion S42 overlaps the second axis C2 (differential gear mechanism 5) on the second side A2 in the axial direction as viewed from above, and the third housing portion S43 overlaps the first axis C1 (speed reduction mechanism 34) on the second side A2 in the axial direction as viewed from above.

In the fourth modification, the vehicle drive device 100D according to the fourth modification is different from the vehicle drive device 100 according to the above embodiment in that the first output member 61 in the form of an intermediate shaft is eliminated. In this case, a drive shaft (not shown) may be directly drivingly connected to the vehicle drive device 100D. In the fourth modification, the case 2D is further different from the case 2 described above in that the output shaft case portion 23 is eliminated.

The fourth modification is suitable when the output member 6 (including, for example, an intermediate shaft or drive shaft attached to the vehicle drive device 100D) has a relatively large radial size. In this case, the range in which the inverter housing chamber S4 extends in the up-down direction may overlap the range in which the output member 6 extends in the up-down direction.

The fourth modification also has the same effects as those of the above embodiment. That is, the power module PM, the smoothing capacitor CM, and the busbar structure 70 can be arranged in the inverter housing chamber S4 in the form of an L-shape as viewed from above so as not to overlap each other in the up-down direction. As a result, the size of the vehicle drive device 100D in the up-down direction can be reduced. Like the inverter case portion 24 according to the above embodiment, the inverter case portion 24D can be disposed so as not to protrude from other portions of the case 2 (portions other than the inverter case portion 24D) as viewed from above. This can prevent an increase in horizontal size of the vehicle drive device 100D due to the inverter case portion 24D.

In the fourth modification, as in the above embodiment, the busbar structure 70 is mainly disposed in the first housing portion S41, the smoothing capacitor CM is mainly disposed in the second housing portion S42, and the power module PM is mainly disposed in the third housing portion S43. However, the present disclosure is not limited to this. For example, the smoothing capacitor CM may be mainly disposed in the first housing portion S41, the busbar structure 70 may be mainly disposed in the second housing portion S42, and the power module PM may be mainly disposed in the third housing portion S43. In this case, the connector CN1 may be disposed on the first housing portion S41.

Figure 11:
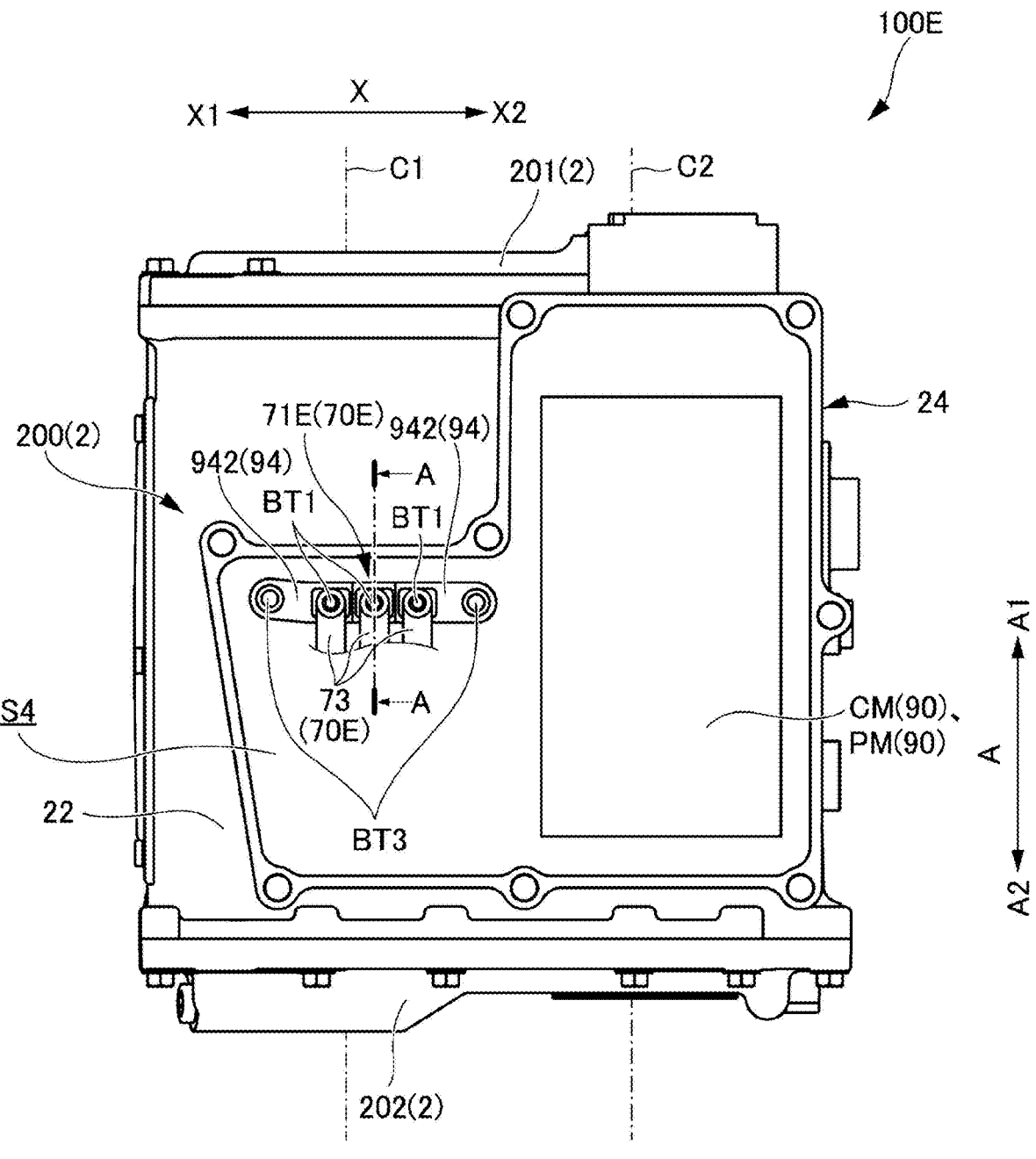
FIG. 11 is a top view schematically showing a vehicle drive device according to a fifth modification.
Figure 12:
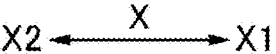
FIG. 12 is a side view schematically showing the vehicle drive device according to the fifth modification.
Figure 13:
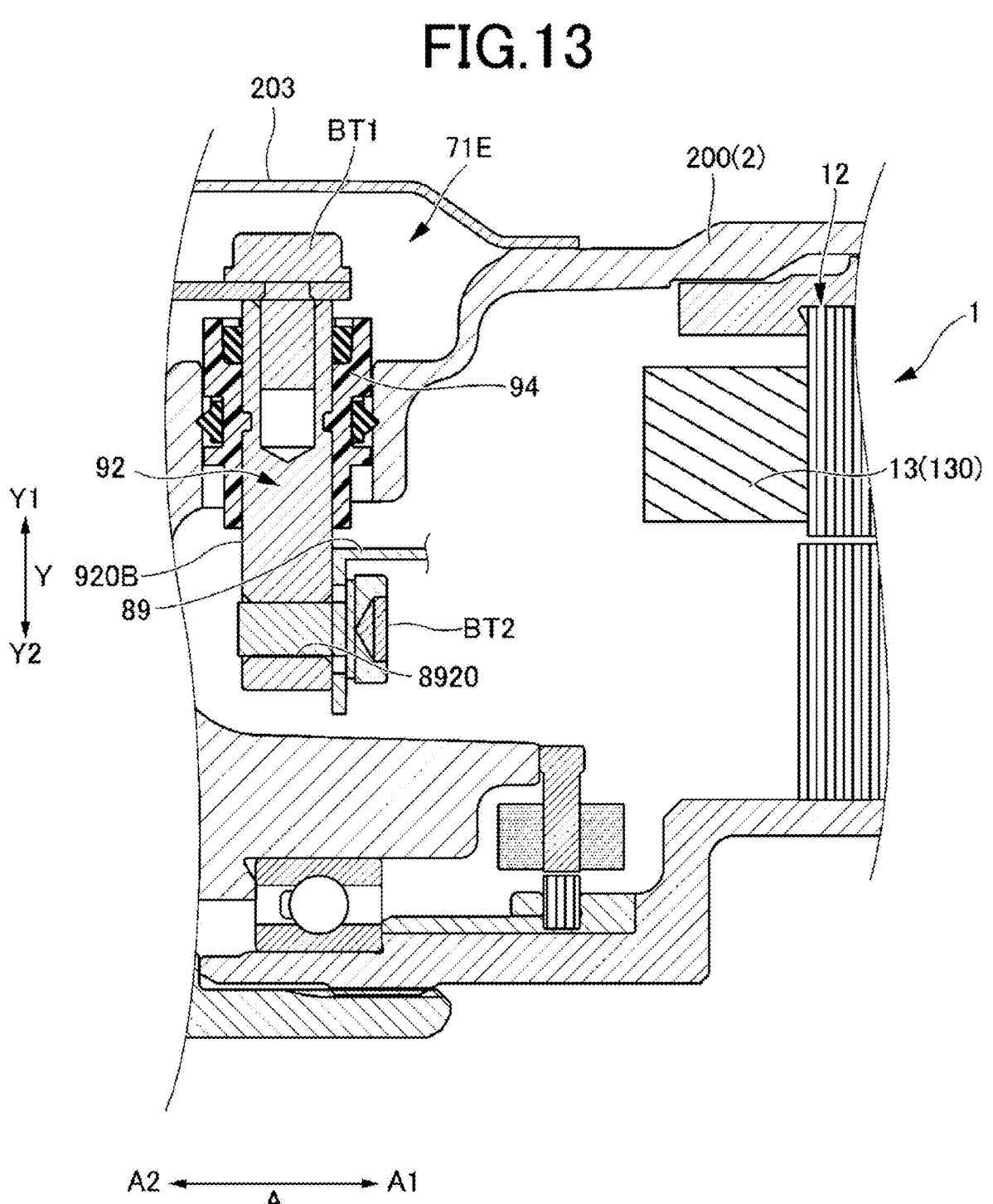
FIG. 13 is a partial sectional view taken along line A-A in FIG. 11.

FIG. 11 is a top view schematically showing a vehicle drive device 100E according to a fifth modification, and FIG. 12 is a side view schematically showing the vehicle drive device 100E according to the fifth modification. In FIG. 11, the inverter cover member 203 (see FIG. 12) that covers the top of the inverter case portion 24 is not shown in order to show elements disposed inside the inverter case portion 24. In FIG. 12, the motor cover member 201 is not shown and the rotor of the rotating electrical machine 1 is also not shown for better understanding of the state in the motor housing chamber S1. FIG. 13 is a partial sectional view taken along line A-A in FIG. 11.

The vehicle drive device 100E according to the fifth modification is different from the vehicle drive device 100 according to the above embodiment mainly in that the first terminal portions 71 of the busbar structure 70 are replaced with a terminal device 71E of a busbar structure 70E.

The terminal device 71E is in the form of a terminal block that connects the busbars 73 to a power line busbar 89. The busbars 73 are in the form of three plates corresponding to the three phases, and may include a portion extending linearly in the axial direction. The busbars 73 may be disposed inside the inverter case portion 24. The ends of the busbars 73 on the A1 side in the A-direction are fastened to the terminal device 71E with bolts BT1. In FIG. 11, the terminal device 71E includes legs 942 of a fixing portion 94, and the fixing portion 94 is fastened to the case 2 with bolts BT3.

The power line busbar 89 may be in the form of three busbars corresponding to the three phases. The power line busbar 89 is extended from the coil end portion 13 (see FIG. 13) of the rotating electrical machine 1 on the A2 side in the A-direction. The power line busbar 89 may extend further toward the A2 side in the A-direction with respect to an end face of the stator core 12 of the rotating electrical machine 1 on the A2 side in the A-direction. One end of the power line busbar 89 is joined to a stator coil 130 (see FIG. 13) of the rotating electrical machine 1, and the other end thereof is fastened to the terminal device 71E with a bolt BT2. The power line busbar 89 may be implemented as a component of the rotating electrical machine 1.

The terminal device 71E is attached to the case 2 on the A2 side of the rotating electrical machine 1 in the A-direction. The terminal device 71E electrically connects the busbars 73 and the power line busbar 89 from the rotating electrical machine 1.

As described above, according to the fifth modification, the fastening positions for the bolts BT1, BT2 are respectively set on the upper surface of each linear conductor portion 92 and the side surface of a lower end 920B of each linear conductor portion 92. As a result, according to the fifth modification, the size of the vehicle drive device 100E in a direction crossing the up-down direction can be reduced compared to a comparative configuration (not shown) in which the fastening positions for the bolts BT1, BT2 are offset from each other in this direction.

As shown in FIG. 12, the power line busbar 89 includes a fastening portion 892 extending radially inward at the coil end portion 13 of the rotating electrical machine 1 on the A2 side in the A-direction. The fastening portion 892 is in the form of a plate and has a bolt insertion hole 8920. The fastening portions 892 of the power line busbars 89 of the phases contact, in a one-to-one relationship, the side surfaces (side surfaces facing the A1 side in the A-direction) of the lower ends 920B of the conductor portions 92, and are fastened thereto in the axial direction with the bolts BT2. In this case, the bolt insertion hole 8920 (see FIG. 13) may have an inner diameter that is relatively larger than the outer diameter of a shaft portion of the bolt BT2. In the case of such fastening, the level of tolerance for misalignment between each power line busbar 89 and the lower end 920B of a corresponding one of the conductor portions 92 is increased. Therefore, even when an allowable tolerance such as an allowable dimensional tolerance is relatively loosened for the power line busbar 89, significant stress due to tightening of the bolt BT2 is less likely to occur.

In the fifth modification, the lower end 920B of each conductor portion 92 is disposed radially inward of the stator core 12 of the rotating electrical machine 1 as viewed in the axial direction. That is, the connection portion (fastening portion 892) between each conductor portion 92 and a corresponding one of the power line busbars 89 from the rotating electrical machine 1 is disposed radially inward of the stator core 12 of the rotating electrical machine 1. The work of fastening the conductor portions 92 and the power line busbars 89 from the rotating electrical machine 1 can thus be implemented with ease by using the space radially inward of the stator core 12.

Next, the structure inside the inverter housing chamber S4 will further be described together with an assembly method with reference to FIGS. 14 to 19. The following description substantially applies to the embodiment described above with reference to FIGS. 1 to 5 or the fifth modification described above with reference to FIGS. 11 to 13, but is also applicable to the other modifications described above with reference to FIGS. 6 to 10.

Figure 14:
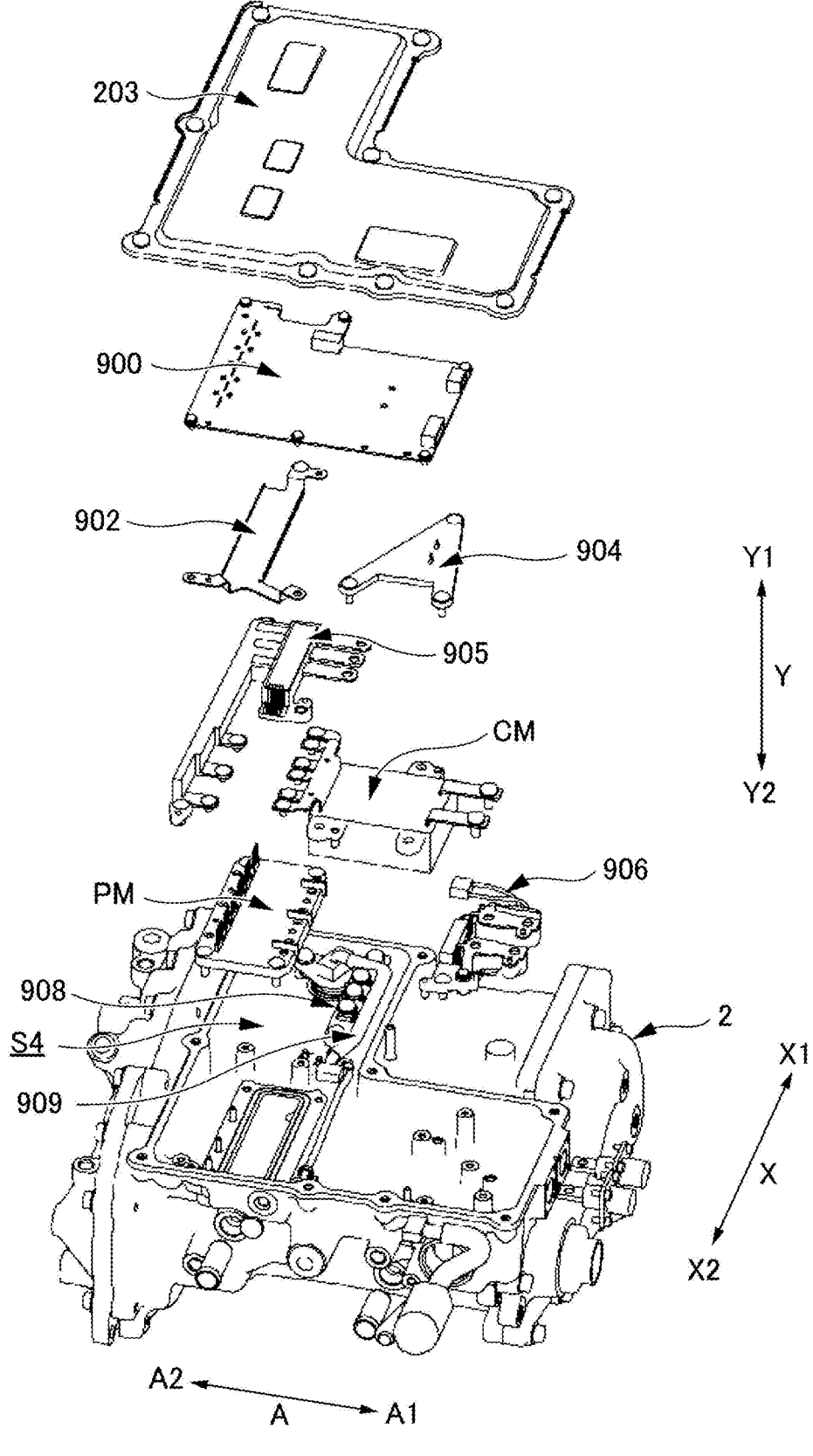
FIG. 14 is an exploded perspective view showing, together with a case, various components disposed in an inverter housing chamber.

FIG. 14 is an exploded perspective view showing, together with the case 2, various components disposed in the inverter housing chamber S4 (hereinafter also referred to as "various components of the inverter device 90"). In FIG. 14, only the inverter cover member 203 of the case 2 is shown disassembled from the other case members (case member 200, motor cover member 201, and differential cover member 202).

In the present embodiment, as shown in FIG. 14, the various components of the inverter device 90 that are disposed in the inverter housing chamber S4 include the control board 900, a shield plate 902, a fixing plate 904, a current sensor module 905, the power module PM, the smoothing capacitor CM, the Y-capacitor 906, a terminal block 908, and a harness with connector 909.

The shield plate 902 is disposed between the power module PM and the control board 900. The shield plate 902 has a function to stabilize the operation of the control board 900 by blocking noise (such as harmonics) generated by the power module PM. The fixing plate 904 forms a seat (base) for fixing the control board 900. The current sensor module 905 is in the form of a module in which the second terminal portion 72 and busbars 73 of the busbar structure 70 and the current sensor 77A are integrated together. The terminal block 908 corresponds to the terminal device 71E of the fifth modification described above with reference to FIGS. 11 to 13. The harness with connector 909 includes a bundle of wires for connecting low-voltage components (e.g., an angle sensor and a temperature sensor that are disposed in the motor housing chamber S1) to the control board 900.

FIGS. 15 to 19 are diagrams illustrating an assembly structure of the above various components of the inverter device 90 disposed in the inverter housing chamber S4, together with an assembly procedure. FIGS. 15 to 19 are top views showing each state, with the figure numbers increasing according to the order of the assembly procedure.

Figure 15:
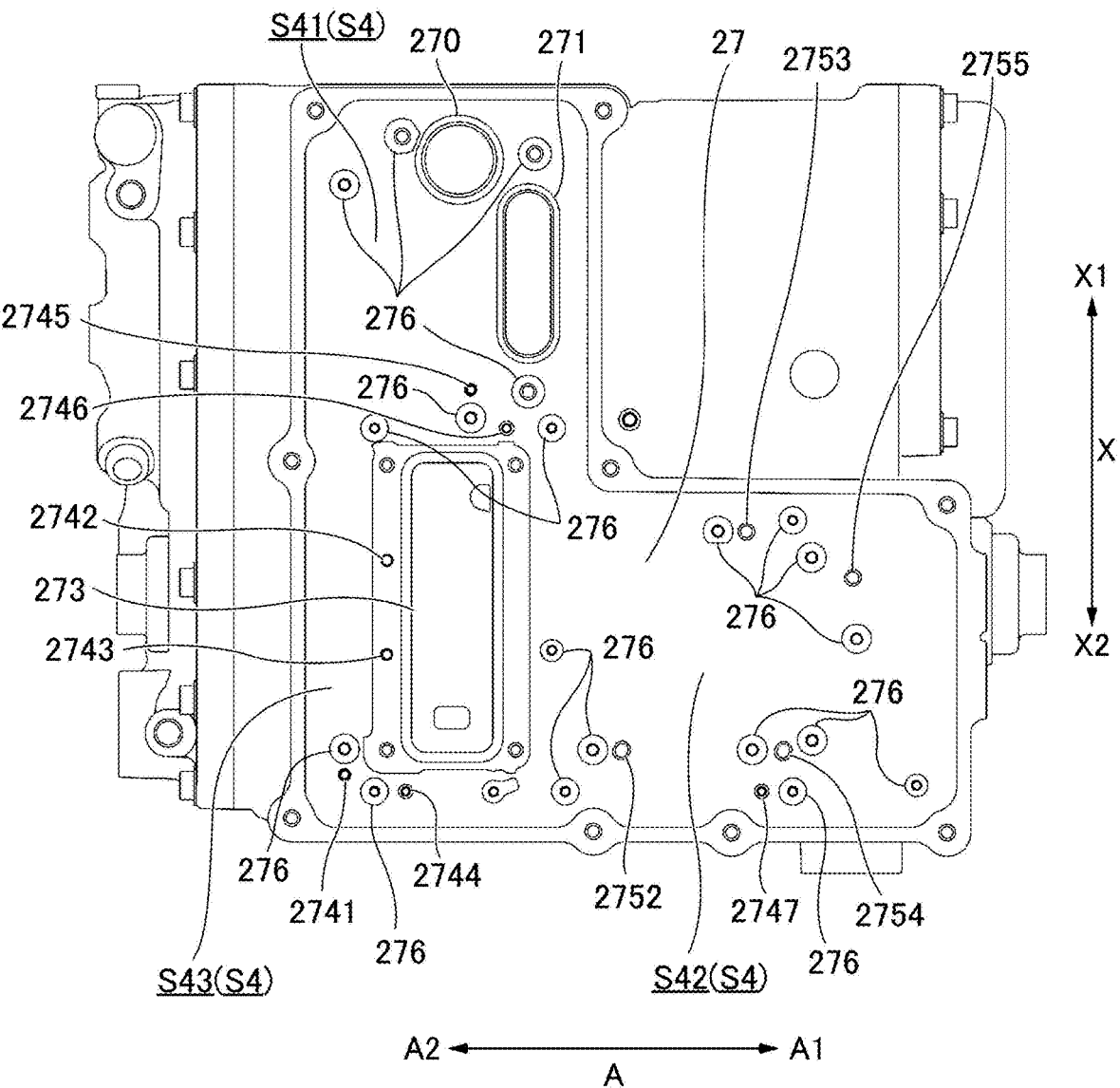
FIG. 15 is a diagram (first diagram) illustrating an assembly structure of the various components of an inverter device disposed in the inverter housing chamber, together with an assembly procedure.

FIG. 15 shows the case 2 in a state before the inverter cover member 203 is attached. In the state shown in FIG. 15, the inverter housing chamber S4 is empty, and the above various components of the inverter device 90 are not disposed therein.

Holes 270, 271 communicating with the motor housing chamber S1, a coolant channel forming portion 273, dowel pins 2741 to 2747, dowel pin holes 2752 to 2755, and fastening holes 276 are provided in a bottom portion 27 of the inverter housing chamber S4 in the case 2. The bottom portion 27 of the inverter housing chamber S4 in the case 2 is in the form of a partition wall that separates the inverter housing chamber S4 from the motor housing chamber S1, the transmission mechanism housing chamber S2, and the output shaft housing chamber S3. The coolant channel forming portion 273 is in the form of a recess recessed toward the second side Y2 in the second direction, and forms part of the bottom portion 27.

In the present embodiment, in the inverter housing chamber S4 as shown in FIG. 14, the various components of the inverter device 90 are stacked substantially in three layers in the Y-direction in order from the first layer, with the layer on the bottom portion 27 being the first layer.

Figure 16:
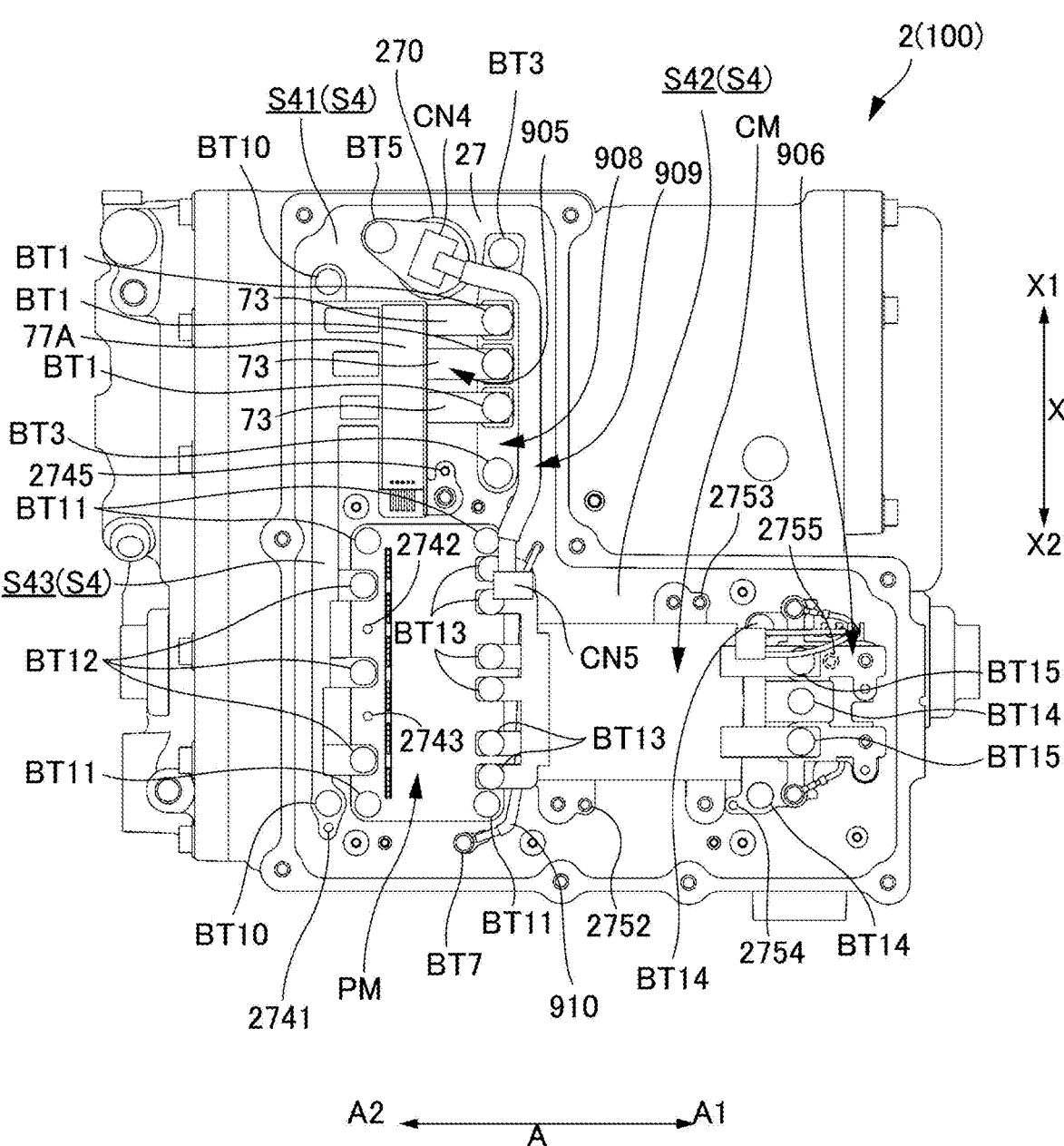
FIG. 16 is a diagram (second diagram) illustrating the assembly structure of the various components of the inverter device disposed in the inverter housing chamber, together with the assembly procedure.

FIG. 16 shows a state in which the current sensor module 905, the power module PM, the smoothing capacitor CM, the Y-capacitor 906, the terminal block 908, and the harness with connector 909, namely components in the first layer out of the various components of the inverter device 90, are disposed.

Specifically, as shown in FIG. 16, the terminal block 908 is fixed to the bottom portion 27 of the case 2 with the bolts BT3.

The power module PM is fixed at its four corners to the bottom portion 27 of the case 2 with fasteners BT11. At this time, the power module PM is positioned with respect to the case 2 via the dowel pins 2742, 2743. The power module PM is provided so as to cover the coolant channel forming portion 273. A seal member (not shown) for providing water tightness may be provided in the lower part of the power module PM.

The Y-capacitor 906 is fixed to the bottom portion 27 of the case 2 with fasteners BT14. At this time, the Y-capacitor 906 is positioned with respect to the case 2 via dowel pins (not shown) fitted in the dowel pin holes 2754, 2755.

The smoothing capacitor CM is positioned with respect to the case 2 via dowel pins (not shown) fitted in the dowel pin holes 2752, 2753, and is fixed to the power module PM and the Y-capacitor 906 with fasteners BT13, BT15, respectively. The fasteners BT13, BT15 have a function to fix terminals while electrically connecting them to each other.

The current sensor module 905 is fixed to the bottom portion 27 of the case 2 with fasteners BT10. The current sensor module 905 is fixed to the terminal block 908 with bolts BT1, and is also fixed to the power module PM with fasteners BT12. At this time, the current sensor module 905 is positioned with respect to the case 2 via the dowel pins 2741, 2745.

The harness with connector 909 includes connectors CN4, CN5 at its ends, and the connector CN4 is fitted in the hole 270 in the bottom portion 27 of the case 2. The connector CN4 of the harness with connector 909 is also fixed to the bottom portion 27 of the case 2 with a fastener BT5. The harness with connector 909 is electrically connected to a low-voltage wire (not shown) in the motor housing chamber S1 via the connector CN4.

A coolant temperature sensor harness 910 is shown in FIG. 16. One end of the coolant temperature sensor harness 910 may be fixed to the bottom portion 27 of the case 2 (near the coolant channel forming portion 273) with a fastener BT7.

Figure 17:
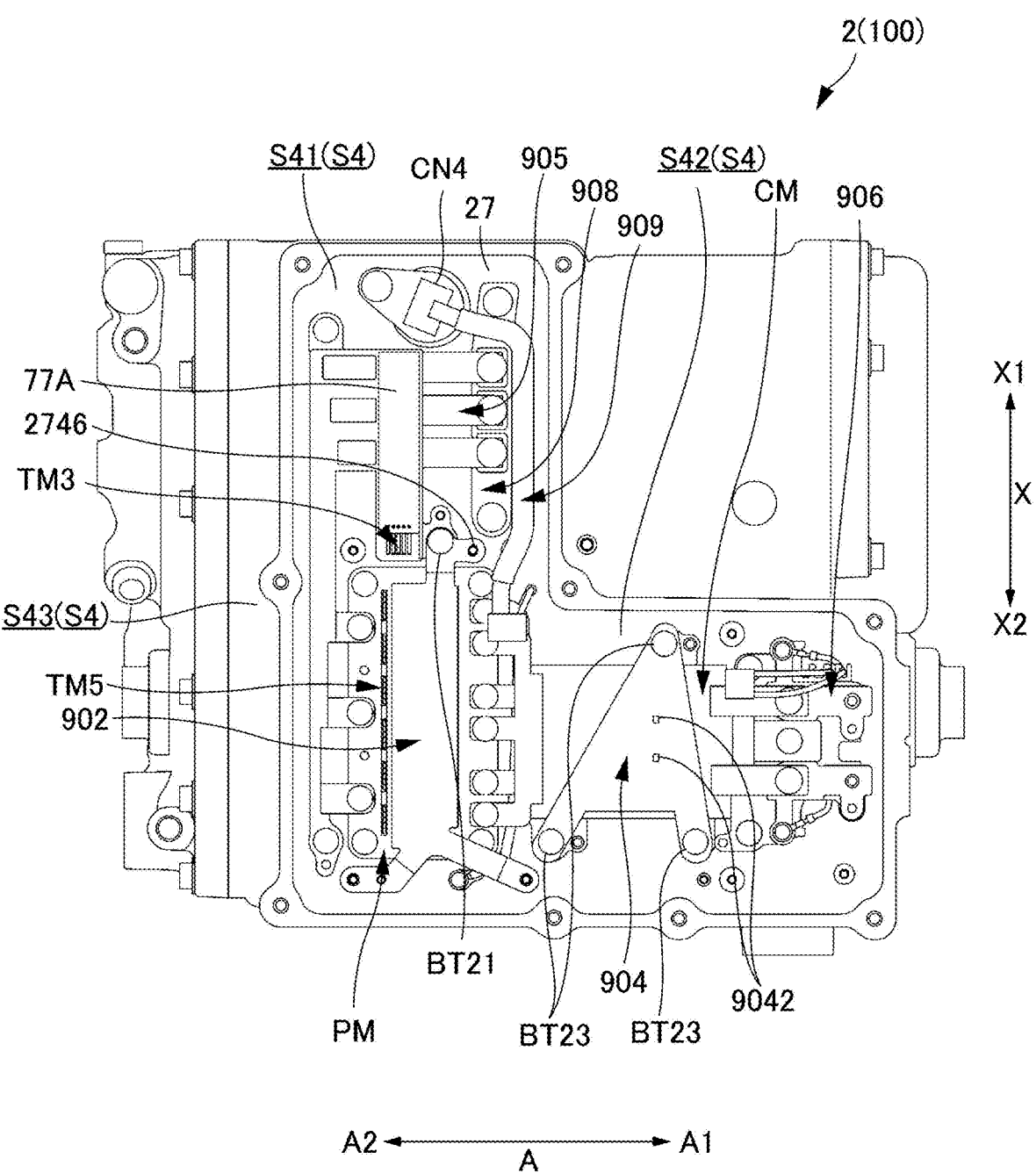
FIG. 17 is a diagram (third diagram) illustrating the assembly structure of the various components of the inverter device disposed in the inverter housing chamber, together with the assembly procedure.

FIG. 17 shows a state in which the shield plate 902 and the fixing plate 904, namely components in the second layer out of the various components of the inverter device 90, are disposed.

The shield plate 902 is fixed to the bottom portion 27 of the case 2 with a fastener BT21. At this time, the shield plate 902 is positioned in the case 2 via the dowel pin 2746.

The fixing plate 904 together with the smoothing capacitor CM is fixed (i.e., fastened together) to the bottom portion 27 of the case 2 with fasteners BT23. The fixing plate 904 has fastening holes 9042 that serve as a seat for the control board 900. The fixing plate 904 is provided so as to cover the first side Y1 of the smoothing capacitor CM in the second direction such that the fixing plate 904 can provide a seat for the control board 900. As shown in FIG. 17, the fixing plate 904 is in the form of a triangular shape as viewed from above, and may be fixed near its three vertices with the fasteners BT23. In the present embodiment, two fastening holes 9042 are provided near the center of the triangle as viewed from above.

Figure 18:
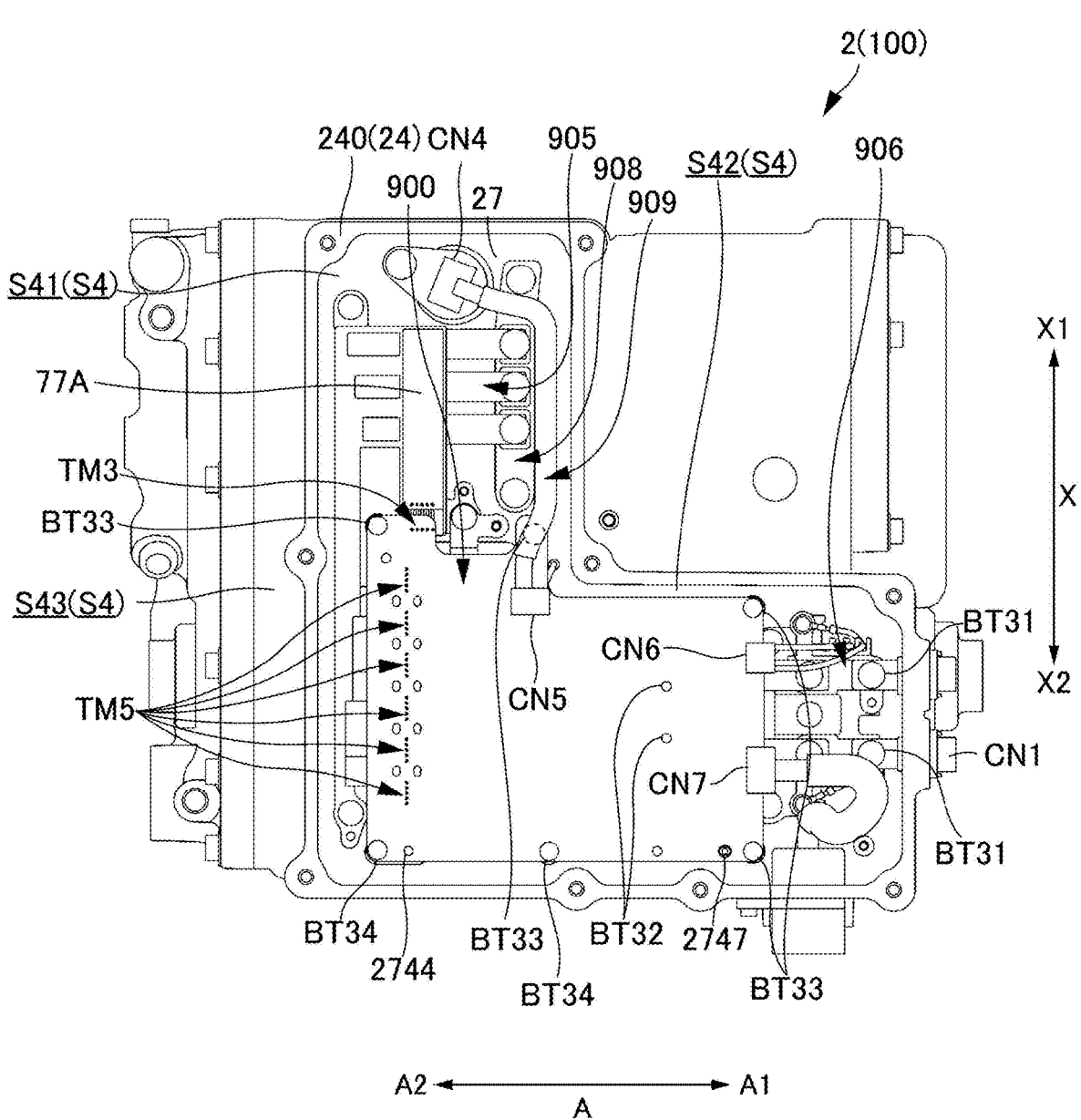
FIG. 18 is a diagram (fourth diagram) illustrating the assembly structure of the various components of the inverter device disposed in the inverter housing chamber, together with the assembly procedure.

FIG. 18 shows a state in which the control board 900, namely a component in the third layer out of the various components of the inverter device 90, is disposed.

The control board 900 is relatively large, and is provided so as to cover the power module PM and the smoothing capacitor CM. The control board 900 is fixed at four of six positions in its outer peripheral portion to the bottom portion 27 of the case 2 with fasteners BT33. The control board 900 together with the shield plate 902 is fixed (i.e., fastened together) at the remaining two positions to the case 2 with fasteners BT34. At this time, the control board 900 together with the shield plate 902 is positioned in the case 2 via the dowel pin 2744, and the control board 900 is also positioned in the case 2 via the dowel pin 2747. The control board 900 is also fixed, at two positions in its central portion, to the fastening holes 9042 of the fixing plate 904 with fasteners BT32. By using the fixing plate 904, the control board 900 can be stably fixed to the case 2 even when the control board 900 is relatively large.

Connectors CN5, CN6, and CN7 are connected to the control board 900. The connector CN5 is an end of the harness with connector 909, and may also be electrically connected to the coolant temperature sensor harness 910. The connectors CN6, CN7 may be an end of a high-voltage detection harness and an end of a control system/low-voltage power supply harness, respectively.

A terminal TM3 from the current sensor 77A of the current sensor module 905 and terminals TM5 (gate drive terminal etc.) from the power module PM are connected to the control board 900 by soldering.

In FIG. 18, in addition to the fastening of the control board 900 described above, the Y-capacitor 906 is fixed to the connector CN1 with fasteners BT31. The fasteners BT31 have a function to fix the terminals together while electrically connecting them to each other.

Figure 19:
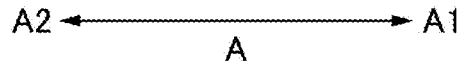
FIG. 19 is a diagram (fifth diagram) illustrating the assembly structure of the various components of the inverter device disposed in the inverter housing chamber, together with the assembly procedure.

FIG. 19 shows a state in which the various components of the inverter device 90 in the inverter housing chamber S4 are covered by the inverter cover member 203. The inverter cover member 203 is fixed to an end face (end face on the first side Y1 in the second direction) of the sidewall 240 of the inverter case portion 24 with fasteners BT40.

According to the present embodiment, the various components of the inverter device 90 in the inverter housing chamber S4 can thus be arranged in multiple layers. Arranging the various components of the inverter device 90 in multiple layers can reduce the size of the inverter housing chamber S4 in the second direction Y, and as a result, can reduce the size of the case 2 (and the vehicle drive device 100) in the second direction Y.

According to the present embodiment, none of the fasteners (bolts BT1 and fasteners BT5 to BT34) used in the inverter housing chamber S4 overlap each other as viewed in the second direction Y. This improves ease of assembly.

According to the present embodiment, the various components of the inverter device 90 are directly fastened to the bottom portion 27 of the case 2. This allows stable fixing of the various components of the inverter device 90. Moreover, it is also possible to remove only part of the components. This improves ease of maintenance.

As described above, in the present embodiment, the speed reduction mechanism 34 disposed on the second side Y2 in the second direction with respect to the first housing portion S41 includes a planetary gear mechanism, and the mounting space around the first axis C1 (mounting space for the speed reduction mechanism 34) is relatively large. For example, in terms only of the first side A1 in the axial direction with respect to the output gear 30 of the differential gear mechanism 5, the mounting space for the planetary gear mechanism 5, the mounting space for the planetary gear mechanism tends to be larger than the mounting space for the differential gear mechanism 5. In other words, when the boundary positions of the first housing portion S41, the second housing portion S42, and the third housing portion S43 on the first side Y1 in the second direction are approximately the same (i.e., when the inverter cover member 203 is planar), the dimension of the first housing portion S41 in the second direction Y tends to be the smallest.

In view of this, in the present embodiment, the control board 900 having a relatively large size is provided in the second housing portion S42 and the third housing portion S43, rather than in the first housing portion S41. In particular, since the current sensor 77A of the current sensor module 905 has a relatively large dimension in the second direction Y, the control board 900 is provided in a range that does not overlap the current sensor 77A of the current sensor module 905 as viewed from above. The control board 900 may overlap the current sensor 77A as viewed in a direction perpendicular to the second direction Y. The inverter device 90 that includes the control board 900 having a relatively large size and the current sensor 77A having a relatively large dimension in the second direction Y can thus be housed in the inverter housing chamber S4 while reducing the size of the case 2 (and the vehicle drive device 100) in the second direction Y.

Although the embodiments are described in detail above, the present disclosure is not limited to the specific embodiments, and various modifications and changes can be made within the scope of the claims. It is also possible to combine all or part of the components of the embodiments described above. Of the effects of each embodiment, those related to dependent claims are additional effects distinct from generic concepts (independent claim).

For example, in the above embodiment, in view of the fact that the dead space around the second axis C2 gradually increases from the second side A2 in the axial direction toward the first side A1 in the axial direction, the smoothing capacitor CM is disposed in the second housing portion S42 and the power module PM is disposed in the third housing portion S43. However, the present disclosure is not limited to this. For example, the smoothing capacitor CM may be disposed in the third housing portion S43, and the power module PM may be disposed in the second housing portion S42. In this case, structures such as the control board 900 and the coolant channel may be arranged in a stacked manner on the first side Y1 in the second direction and/or the second side Y2 in the second direction with respect to the power module PM. Such a configuration is suitable when the dimension in the second direction Y of the stacked structure including the power module PM is significantly larger than the dimension in the second direction Y of the smoothing capacitor CM.

In the above embodiment, the vehicle drive device 100 (and the vehicle drive device 100A etc.) has a two-axis configuration of the first axis C1 and the second axis C2. However, the present disclosure is not limited to this, as described above. For example, as in a vehicle drive device 100F shown in FIG. 20, a counter gear mechanism 4 may be used instead of the speed reduction mechanism 34. In this case, the counter gear mechanism 4 is provided such that a first counter gear 42 that meshes with a gear 17 of the input member 16 from the rotating electrical machine 1 and a second counter gear 43 that meshes with the output gear 30 of the differential gear mechanism 5 rotate with a counter shaft 41. The second counter gear 43 may have a smaller diameter than the first counter gear 42. In this case, a three-axis configuration including a third axis C3 in addition to the first axis C1 and the second axis C2 is implemented. The configuration of the case 2 etc. according to the above embodiment is also applicable to such a three-axis configuration.

In the above embodiment, the smoothing capacitor CM is disposed at approximately the same position as the power module PM in the first direction X. However, the present disclosure is not limited to this. For example, the smoothing capacitor CM may be partially or entirely disposed on the second side X2 in the first direction with respect to the power module PM. In this case, the smoothing capacitor CM may be disposed on a side surface of the case 2 on the second side X2 in the first direction.

DESCRIPTION OF THE REFERENCE NUMERALS

1 . . . rotating electrical machine, 2 . . . case, 21 . . . motor case portion (fourth housing portion), 240 . . . sidewall, 34 . . . speed reduction mechanism (power transmission device), 30 . . . output gear (ring gear), 5 . . . differential gear mechanism (differential transmission device), 70, 70A . . . busbar structure (wiring portion), 71 . . . first terminal portion, 72 . . . second terminal portion, 73 . . . busbar, 721 . . . terminal-side busbar (busbar), BA . . . battery (power supply), A . . . axial direction, Y . . . up-down direction, PM . . . power module, CM . . . smoothing capacitor, S1 . . . motor housing chamber (fourth housing portion), S4 . . . inverter housing chamber (housing chamber), S41 . . . first housing portion, S42 . . . second housing portion, S43 . . . third housing portion, P2 . . . line (highest position of fourth housing portion), C1 . . . first axis, C2 . . . second axis

The invention claimed is:

1. A vehicle drive device comprising:
a rotating electrical machine disposed on a first axis;
a differential transmission device disposed on a second axis parallel to the first axis and drivingly connected to a wheel;
a power transmission device disposed on the first axis and drivingly connected between the differential transmission device and the rotating electrical machine;
a power module including a power semiconductor element and configured to convert electric power to be supplied to the rotating electrical machine;
a smoothing capacitor electrically connected between the power module and a power supply;
a wiring portion that electrically connects the rotating electrical machine and the power module; and
a case that houses the rotating electrical machine, the differential transmission device, the power transmission device, the power module, the smoothing capacitor, and the wiring portion, wherein:
the case forms a housing portion above a plane including the first axis and the second axis;
the housing portion includes a first housing portion that houses the wiring portion, a second housing portion that houses the smoothing capacitor, and a third housing portion that houses the power module; and
the first housing portion, the second housing portion, and the third housing portion are in an L-shape as a whole and overlap the first axis and the second axis, as viewed in an up-down direction.

2. The vehicle drive device according to claim 1, wherein the wiring portion, the smoothing capacitor, and the power module overlap the rotating electrical machine as viewed in a direction perpendicular to the up-down direction.

3. The vehicle drive device according to claim 1, wherein:
the case further forms a fourth housing portion that houses the rotating electrical machine, and the case includes a sidewall that serves as a boundary of the housing portion in a direction perpendicular to the up-down direction; and
the sidewall is located below a highest position of the fourth housing portion.

4. The vehicle drive device according to claim 1, wherein:
the first housing portion overlaps the rotating electrical machine as viewed in an axial direction, and overlaps the power transmission device as viewed in the up-down direction;
the second housing portion overlaps the rotating electrical machine as viewed in a direction perpendicular to both the axial direction and the up-down direction, and overlaps the second axis as viewed in the up-down direction; and
the third housing portion is adjacent to the first housing portion and the second housing portion, and overlaps the second axis as viewed in the up-down direction.

5. The vehicle drive device according to claim 1, wherein an end of the wiring portion on the rotating electrical machine side extends in the up-down direction through a wall forming a lower part of the housing portion of the case.

6. The vehicle drive device according to claim 1, wherein:
the wiring portion includes, for each of phases of the rotating electrical machine, a first terminal portion connected to a power line of the rotating electrical machine, a second terminal portion electrically connected to the power module, and a busbar between the first terminal portion and the second terminal portion; and
the first terminal portions of the phases are arranged next to each other in a direction perpendicular to both an axial direction and the up-down direction.

7. The vehicle drive device according to claim 6, wherein the second terminal portions of the phases are connected to one of four sides around the power module that is farther away from the smoothing capacitor in the axial direction or to one of the four sides that faces the busbar in a direction perpendicular to the axial direction, as viewed in the up-down direction.

8. The vehicle drive device according to claim 6, wherein the busbars are arranged so as not to overlap each other as viewed in the up-down direction.

9. The vehicle drive device according to claim 1, wherein the smoothing capacitor and the power module are adjacent to each other in an axial direction or in a direction perpendicular to the axial direction, as viewed in the up-down direction.

10. The vehicle drive device according to claim 1, wherein the wiring portion, the smoothing capacitor, and the power module overlap the differential transmission device as viewed in a direction perpendicular to the up-down direction.

11. The vehicle drive device according to claim 1, wherein the wiring portion, the smoothing capacitor, and the power module overlap the power transmission device as viewed in a direction perpendicular to the up-down direction.

12. The vehicle drive device according to claim 1, wherein the wiring portion, the smoothing capacitor, and the power module overlap an output member disposed on the second axis, as viewed in a direction perpendicular to the up-down direction.

* * * * *